US011636763B2

United States Patent
Oe et al.

(10) Patent No.: US 11,636,763 B2
(45) Date of Patent: Apr. 25, 2023

(54) DRIVING ASSISTANCE DEVICE, INFORMATION PROCESSING DEVICE, DRIVING ASSISTANCE SYSTEM, DRIVING ASSISTANCE METHOD

(71) Applicant: TOYOTA JIDOSHA KABUSHIKI KAISHA, Toyota (JP)

(72) Inventors: Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 17/301,511

(22) Filed: Apr. 5, 2021

(65) Prior Publication Data
US 2021/0225170 A1 Jul. 22, 2021

Related U.S. Application Data

(62) Division of application No. 16/150,839, filed on Oct. 3, 2018, now Pat. No. 11,004,339.

(30) Foreign Application Priority Data

Oct. 5, 2017 (JP) ............................. JP2017-194995

(51) Int. Cl.
*G08G 1/16* (2006.01)
*B60W 40/04* (2006.01)
(Continued)

(52) U.S. Cl.
CPC ............. *G08G 1/164* (2013.01); *B60W 40/04* (2013.01); *B60W 40/08* (2013.01); *B60W 50/14* (2013.01);
(Continued)

(58) Field of Classification Search
None
See application file for complete search history.

(56) References Cited

U.S. PATENT DOCUMENTS 5,521,823 A * 5/1996 Akita ................... B60W 10/10
701/1
9,751,534 B2 * 9/2017 Fung ..................... G06V 40/70
(Continued)

FOREIGN PATENT DOCUMENTS

CN 106611505 A 5/2017
JP 2003-329465 A 11/2003
(Continued)

OTHER PUBLICATIONS

IEEE ref: J. Kazazi, S. Winkler and M. Vollrath, "Accident Prevention through Visual Warnings: How to Design Warnings in Head-up Display for Older and Younger Drivers," 2015 IEEE 18th International Conference on Intelligent Transportation Systems, Las Palmas, 2015, pp. 1028-1034, doi: 10.1109 (Year: 2015).

*Primary Examiner* — Krishnan Ramesh
(74) *Attorney, Agent, or Firm* — Hunton Andrews Kurth LLP

(57) ABSTRACT

A driving assistance device for a driver of a vehicle includes an electronic control unit configured to, before the vehicle passes through a predetermined position in a predetermined direction, acquire information relating to a predetermined traffic regulation to be applied when the vehicle passes through the predetermined position in the predetermined direction, acquire an observance tendency of an other driver relating to the predetermined traffic regulation, a degree of similarity between a predetermined characteristic of the other driver and the predetermined characteristic of the
(Continued)

driver of the vehicle is equal to or greater than a predetermined value, before the vehicle passes through the predetermined position in the predetermined direction, output a warning to prompt observance of the predetermined traffic regulation, and change an output state of the warning to prompt observance of the predetermined traffic regulation based on the observance tendency of the traffic regulation of another driver.

8 Claims, 10 Drawing Sheets

(51) Int. Cl.
*B60W 40/08* (2012.01)
*G09B 29/10* (2006.01)
*B60W 50/14* (2020.01)
*G09B 19/16* (2006.01)

(52) U.S. Cl.
CPC ....... *B60W 2050/146* (2013.01); *G08G 1/166* (2013.01); *G09B 19/167* (2013.01); *G09B 29/10* (2013.01)

(56) References Cited

U.S. PATENT DOCUMENTS

| | | | |
|---|---|---|---|
| 10,308,258 | B2 | 6/2019 | Fung et al. |
| 10,625,673 | B2 | 4/2020 | Shibata et al. |
| 10,627,813 | B2* | 4/2020 | Tsuji ..................... B60W 10/06 |
| 10,783,725 | B1* | 9/2020 | Gaudin .................. G07C 5/008 |
| 10,816,993 | B1* | 10/2020 | Tran ..................... G06V 20/588 |
| 2009/0210257 | A1* | 8/2009 | Chalfant ............... B60W 40/09 |
| | | | 705/4 |
| 2017/0305349 | A1* | 10/2017 | Naboulsi ................. B60R 1/025 |
| 2018/0022358 | A1 | 1/2018 | Fung et al. |
| 2018/0194280 | A1* | 7/2018 | Shibata .............. G01C 21/3484 |
| 2019/0100216 | A1* | 4/2019 | Volos ..................... G06Q 40/08 |
| 2019/0108752 | A1 | 4/2019 | Oe et al. |

FOREIGN PATENT DOCUMENTS

| | | |
|---|---|---|
| JP | 2006-258428 A | 9/2006 |
| JP | 2007-287083 A | 11/2007 |
| JP | 2014046820 A | 3/2014 |
| JP | 2014137682 A | 7/2014 |
| JP | 2015064675 A | 4/2015 |
| JP | 2015099465 A | 5/2015 |
| JP | 2016062470 A | 4/2016 |

\* cited by examiner

206

WARNING POINT LIST

| POINT ID | REGULATION TYPE | NODE ID | SOURCE NODE ID | LINK ID | DISTANCE FROM SOURCE NODE | WARNING |
|---|---|---|---|---|---|---|
| ... | ... | ... | ... | ... | ... | ... |
| 100 | 1 | 3002 | 3000 | - | - | PRESENT |
| 103 | 3 | - | 3105 | 5442303 | 40 | ABSENT |
| 120 | 1 | 4100 | 4111 | - | - | ABSENT |
| 133 | 2 | - | 4123 | 5449900 | 10 | PRESENT |
| ... | ... | ... | ... | ... | ... | ... |

(REGULATION TYPE) 1: TEMPORARY STOP 2: SPEED LIMIT 3: NO PASSING

| DRIVING OPERATION INFORMATION DB | | | | | |
|---|---|---|---|---|---|
| | WARNING POINT p1 | WARNING POINT p2 | ... | WARNING POINT pL | ... |
| DRIVER D1 | - | × | ... | ○ | ... |
| DRIVER D2 | × | ○ | ... | × | ... |
| DRIVER D3 | ○ | ○ | ... | ○ | ... |
| ... | ... | ... | ... | ... | ... |
| DRIVER DM | × | ○ | ... | - | ... |

| DRIVING BEHAVIOR CHARACTERISTIC INFORMATION DB | | | | | |
|---|---|---|---|---|---|
| | DRIVER D1 | DRIVER D2 | DRIVER D3 | ... | DRIVER DM |
| AVERAGE SPEED [km/h] | 45 | 65 | 50 | ... | 60 |
| SUDDEN START AND SUDDEN STOP [%] | 50 | 80 | 20 | ... | 70 |
| SUDDEN STEERING [%] | 0 | 20 | 3 | ... | 10 |

BASIC CHARACTERISTIC INFORMATION DB

|  | DRIVER D1 | DRIVER D2 | DRIVER D3 | ... | DRIVER DM |
|---|---|---|---|---|---|
| AGE | 20 | 35 | 52 | ... | 30 |
| SEX | 1 | 0 | 0 | ... | 0 |
| NUMBER OF YEARS OF DRIVING | 1 | 15 | 30 | ... | 12 |
| TRAVELING DISTANCE [km] | 200 | 185000 | 552000 | ... | 152000 |

(SEX) MALE: 0 FEMALE: 1

WARNING POINT INFORMATION DB

| POINT ID | REGULATION TYPE | NODE ID | SOURCE NODE ID | LINK ID | DISTANCE FROM SOURCE NODE |
|---|---|---|---|---|---|
| ... | ... | ... | ... | ... | ... |
| 100 | 1 | 3002 | 3000 | - | - |
| 101 | 1 | 3005 | 3004 | - | - |
| 102 | 2 | - | 2995 | 5442280 | 20 |
| 103 | 3 | - | 3105 | 5442303 | 40 |
| ... | ... | ... | ... | ... | ... |

FIG. 12

|  | DRIVER DM ||
|  | (WHOLE) | (PRESENT TRIP) |
| --- | --- | --- |
| AVERAGE SPEED [km/h] | 50 | 65 |
| SUDDEN START AND SUDDEN STOP [%] | 20 | 50 |
| SUDDEN STEERING [%] | 5 | 30 |

DRIVING ASSISTANCE DEVICE, INFORMATION PROCESSING DEVICE, DRIVING ASSISTANCE SYSTEM, DRIVING ASSISTANCE METHOD

INCORPORATION BY REFERENCE

This is a divisional application of U.S. patent application Ser. No. 16/150,839, filed Oct. 3, 2018, which claims the disclosure of Japanese Patent Application No. 2017-194995 filed on Oct. 5, 2017 including the specification, drawings and abstract are incorporated herein by reference in their entirety.

BACKGROUND

1. Technical Field

The present disclosure relates to a driving assistance device and the like.

2. Description of Related Art

In the related art, a driving assistance device that outputs a warning to prompt observance of traffic regulations, such as temporary stop, is known.

For example, Japanese Unexamined Patent Application Publication No. 2003-329465 (JP 2003-329465 A) discloses a technique that changes an output state of the presence or absence of output of a warning, a level of the warning, or the like according to the degree of relevance between circumstances of a current position of a target vehicle and past warning circumstances based on information relating to warning circumstances collected for each warning candidate point from a plurality of vehicles.

SUMMARY

However, in JP 2003-329465 A, in controlling the presence or absence of the output of the warning, or the like, positional information at the time of a past warning and circumstances relating to a surrounding environment of a target point, such as weather, are merely taken into consideration, and characteristics of a driver are not taken into consideration. For this reason, there is an individual difference in an observance tendency of a traffic regulation, and for example, an unneeded warning may be output for a driver who has a tendency to comparatively observe the traffic regulation.

Accordingly, the present disclosure provides a driving assistance device, an information processing device, a driving assistance system, and a driving assistance method capable of outputting a warning (hereinafter, simply referred to as a "warning") to prompt observance of traffic regulations.

A first aspect of the present disclosure relates to a driving assistance device for a driver of a vehicle. The driving assistance device includes an electronic control unit. The electronic control unit is configured to, before the vehicle passes through a predetermined position in a predetermined direction, acquire information relating to a predetermined traffic regulation to be applied when the vehicle passes through the predetermined position in the predetermined direction, acquire an observance tendency of an other driver relating to the predetermined traffic regulation, a degree of similarity between a predetermined characteristic of the other driver and the predetermined characteristic of the driver of the vehicle being equal to or greater than a predetermined value, before the vehicle passes through the predetermined position in the predetermined direction, output a warning to prompt observance of the predetermined traffic regulation, and change an output state of the warning to prompt observance of the predetermined traffic regulation based on the observance tendency of the traffic regulation of the other driver.

According to the first aspect of the present disclosure, a driver to be a target (hereinafter, referred to as a "target driver") is supposed to have the same observance tendency as the observance tendency relating to the traffic regulation of the other driver having a similar characteristic to the target driver. For example, in a case where a similar driver definitely observes a traffic regulation to be applied when a vehicle passes through a predetermined position in a predetermined direction, the driving assistance device can determine that the target driver is also highly likely to observe the traffic regulation. For this reason, before the vehicle that is driven by the target driver passes through the predetermined position in the predetermined direction, the driving assistance device can change the output state of the warning in conformity with the target driver, such as dispensing a warning to be output or making a warning level relatively low. Accordingly, the driving assistance device takes into account the observance tendency of the other driver relating to the traffic regulation, thereby outputting a warning to prompt observance of the traffic regulation taking the characteristic of the target driver into consideration.

In the driving assistance device according to the first aspect of the present disclosure, the electronic control unit may be configured to, based on the observance tendency of the other driver, change the presence or absence of the output of the warning or a level of the warning.

According to the first aspect of the present disclosure, the driving assistance device changes the presence or absence of the output of the warning or the level of the warning, thereby specifically outputting a warning taking the characteristic of the target driver into consideration.

In the driving assistance device according to the first aspect of the present disclosure, the electronic control unit may be configured to acquire information relating to the observance tendency of the other driver from an information processing device communicable with the vehicle.

According to the first aspect of the present disclosure, the driving assistance device can specifically change the presence or absence of the output of the warning or the level of the warning using information acquired from an information processing device, such as a remote server.

In the driving assistance device according to the first aspect of the present disclosure, the electronic control unit may be configured to acquire information relating to the presence or absence of the output of the warning or information relating to the level of the warning from an information processing device communicable with the vehicle.

According to the first aspect of the present disclosure, the driving assistance device can acquire information relating to the presence or absence of the output of the warning or information relating to the level of the warning, and thus, can comparatively easily change the presence or absence of the output of the warning or the level of the warning. That is, the driving assistance device can output a warning with simple processing.

A second aspect of the present disclosure relates to an information processing device. The information processing device includes communication equipment and a processing device. The processing device is configured to acquire and store a predetermined traffic regulation to be applied when each of a plurality of vehicles passes through a predetermined position in a predetermined direction and regulation observance information relating to an observance tendency of a driver of each of the vehicles relating to the predetermined traffic regulation from the vehicles through the communication equipment, store driver characteristic information relating to a predetermined characteristic item of the driver of each of the vehicles, extract another driver among the drivers of the vehicles similar in the characteristic item to a driver of one vehicle among the drivers of the vehicles based on the driver characteristic information, and transmit information relating to an observance tendency of the other driver relating to the predetermined traffic regulation to the one vehicle through the communication equipment based on the regulation observance information of the other driver.

According to the second aspect of the present disclosure, from the observance tendency of the other driver having a similar characteristic to the driver (target driver) of the one vehicle, the target driver is also supposed to have the same observance tendency relating to the traffic regulation. For example, in a case where a similar driver definitely observes a traffic regulation to be applied when a vehicle passes through the predetermined position in the predetermined direction, the information processing device can determine that the target driver is also highly likely to observe the traffic regulation. For this reason, the information processing device can change the output state of the warning in the one vehicle in conformity with the target driver, such that dispensing a warning to be output before the vehicle that is driven by the target driver passes through the predetermined position in the predetermined direction or making a warning level relatively low. Accordingly, the information processing device transmits information relating to the observance tendency of the other driver to the one vehicle, thereby making a warning to prompt observance of the traffic regulation taking the characteristic of the target driver into consideration through the observance tendency of the other driver be output in the one vehicle.

In the information processing device according to the second aspect of the present disclosure, the processing device may be configured to, based on the regulation observance information of the other driver, determine the presence or absence of output of a warning to prompt observance of the traffic regulation or a level of the warning in a case where the one vehicle passes through the predetermined position in the predetermined direction. The processing device may be configured to transmit the information relating to the presence or absence of the output of the warning or the level of the warning determined by the processing device to the one vehicle.

According to the second aspect of the present disclosure, the information processing device can transmit information relating to the presence or absence of the output of the warning to prompt observance of the traffic regulation or the level of the warning to the one vehicle. Accordingly, the information processing device can comparatively easily change the presence or absence of the output of the warning or the level of the warning in the one vehicle. That is, the information processing device can make a warning be output in the one vehicle with simple processing.

In the information processing device according to the second aspect of the present disclosure, the one vehicle may be a vehicle during starting. The processing device may be configured to acquire the driver characteristic information from the vehicles through the communication equipment. The processing device may be configured to acquire the difference between the past driver characteristic information of the driver of the one vehicle and the present driver characteristic information after start of the driver of the one vehicle during starting. The processing device may be configured to, in a case where the difference exceeds a predetermined reference, extract the other driver based on the present driver characteristic information after start of the driver of the one vehicle and the driver characteristic information of each of the drivers of the vehicles other than the one vehicle.

According to the second aspect of the present disclosure, in a case where there is a certain level of difference between the past driver characteristic information of the target driver acquired from the one vehicle and the present (present trip) driver characteristic information after start, for example, the information processing device can determine that the characteristic of the target driver is different from during normal due to any reason, such as being behind schedule. Accordingly, in this case, the information processing device extracts a similar driver solely using the present driver characteristic information after start of the target driver of the one vehicle, instead of the past driver characteristic information, thereby making a warning be output in the one vehicle in conformity with the characteristic of the target driver different from during normal.

In the information processing device according to the second aspect of the present disclosure, the processing device may be configured to extract the other driver in such a manner that, when the difference between a numerical value of the characteristic item of the driver of the one vehicle and a numerical value of the characteristic item of each of the drivers of the vehicles other than the one vehicle becomes smaller, similarity of the driver of the one vehicle and each of the drivers of the vehicles becomes higher.

According to the second aspect of the present disclosure, the information processing device can specifically calculate similarity based on the difference between the numerical values of the target driver and a driver to be compared for one or each of a plurality of characteristic items, and extract a similar driver.

In the information processing device according to the second aspect of the present disclosure, the characteristic item may include an item relating to a driving behavior. The item relating to the driving behavior may include at least one of an average vehicle speed, a frequency of sudden start, a frequency of sudden stop, a frequency of sudden steering, and a frequency of drift of the vehicle.

According to the second aspect of the present disclosure, the information processing device can specifically extract a similar driver taking a characteristic item relating to a driving behavior of a driver into consideration. Accordingly, the information processing device can make a warning be output in a target vehicle taking the characteristic relating to the driving behavior of the target driver into consideration.

In the information processing device according to the second aspect of the present disclosure, the characteristic item may include an item relating to a driving experience. The item relating to the driving experience may include at least one of the number of years of driving and a traveling distance.

According to the second aspect of the present disclosure, the information processing device can specifically extract a similar driver taking a characteristic item relating to a driving experience of a driver into consideration. Accordingly, the information processing device can make a warning be output in a target vehicle taking the characteristic relating to the driving experience of the target driver into consideration.

In the information processing device according to the second aspect of the present disclosure, the characteristic item may include an item relating to a basic attribute. The item relating to the basic attribute may include at least one of age and sex.

According to the second aspect of the present disclosure, the information processing device can specifically extract a similar driver further taking a characteristic item relating to a basic attribute of a driver into consideration. Accordingly, the information processing device can make a warning be output in a target vehicle taking the characteristic relating to the basic attribute of the target driver into consideration.

A third aspect of the present disclosure relates to a driving assistance system. The driving assistance system includes a plurality of vehicles and a server. The server is configured to be able to perform communication with the vehicles. The server is configured to acquire and store a predetermined traffic regulation to be applied when each of the vehicles passes through a predetermined position in a predetermined direction and regulation observance information relating to an observance tendency of a driver of each of the vehicles relating to the predetermined traffic regulation from the vehicles. The server is configured to store driver characteristic information relating to a predetermined characteristic item of the driver of each of the vehicles. The server is configured to extract another driver among the drivers of the vehicles similar in the characteristic item to a driver of one vehicle among the drivers of the vehicles based on the driver characteristic information. The server is configured to transmit information relating to an observance tendency of the other driver relating to the traffic regulation to the one vehicle based on the regulation observance information of the other driver. At least one of the vehicles is configured to, before the vehicle passes through the predetermined position in the predetermined direction, output a warning to prompt observance of the predetermined traffic regulation. The vehicle is configured to change an output state of the warning based on information relating to the observance tendency of the other driver relating to the traffic regulation received from the server.

A fourth aspect of the present disclosure relates to a driving assistance method for a drive of a vehicle. The vehicle includes an electronic control unit. The driving assistance method includes, with the electronic control unit, before the vehicle passes through a predetermined position in a predetermined direction, outputting a warning to prompt observance of a predetermined traffic regulation to be applied when the vehicle passes through the predetermined position in the predetermined direction, and changing an output state of the warning based on an observance tendency of an other driver relating to the predetermined traffic regulation. A degree of similarity between a predetermined characteristic of the other driver and the predetermined characteristic of the driver of the vehicle is equal to or greater than a predetermined value.

According to the aspects of the present disclosure, it is possible to provide a driving assistance device and the like capable of outputting a warning to prompt observance of a traffic regulation taking a characteristic of a driver into consideration.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a table showing an example of a driving operation information DB;

FIG. 6 is a table showing an example of a driving behavior characteristic information DB;

FIG. 7 is a table showing an example of a basic characteristic information DB;

FIG. 8 is a table showing an example of a warning point information DB;

FIG. 12 is a table showing an example of driving behavior characteristics over the past and a present (present trip) driving behavior characteristic of a target driver.

DETAILED DESCRIPTION OF EMBODIMENTS

Figure 1:
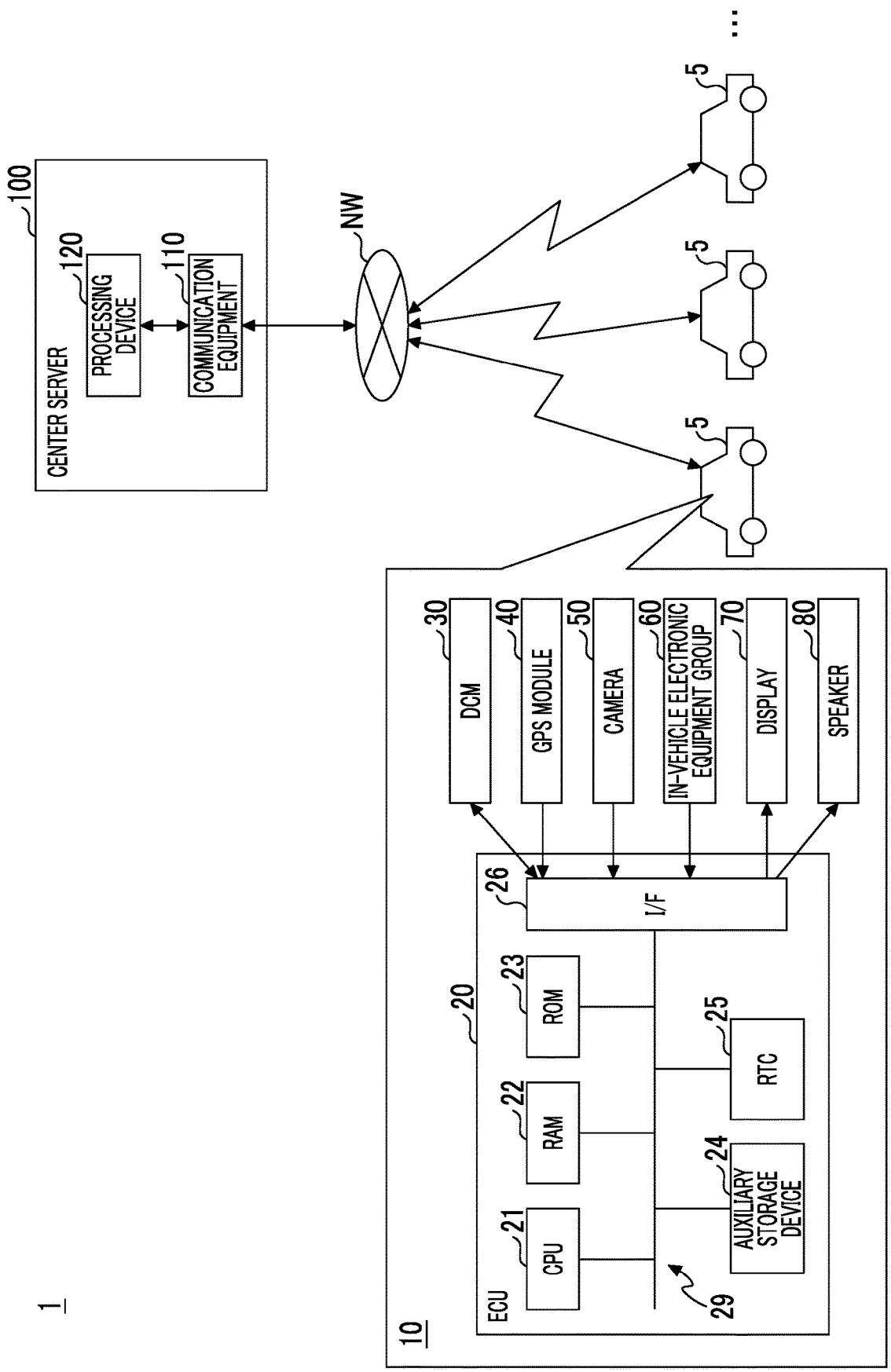
FIG. 1 is a diagram showing an example of the configuration of a driving assistance system according to an embodiment of the present disclosure.

Hereinafter, a mode for carrying out the present disclosure will be described referring to the drawings.

First Embodiment

A first embodiment will be described.

Configuration of Driving Assistance System

Figure 2:
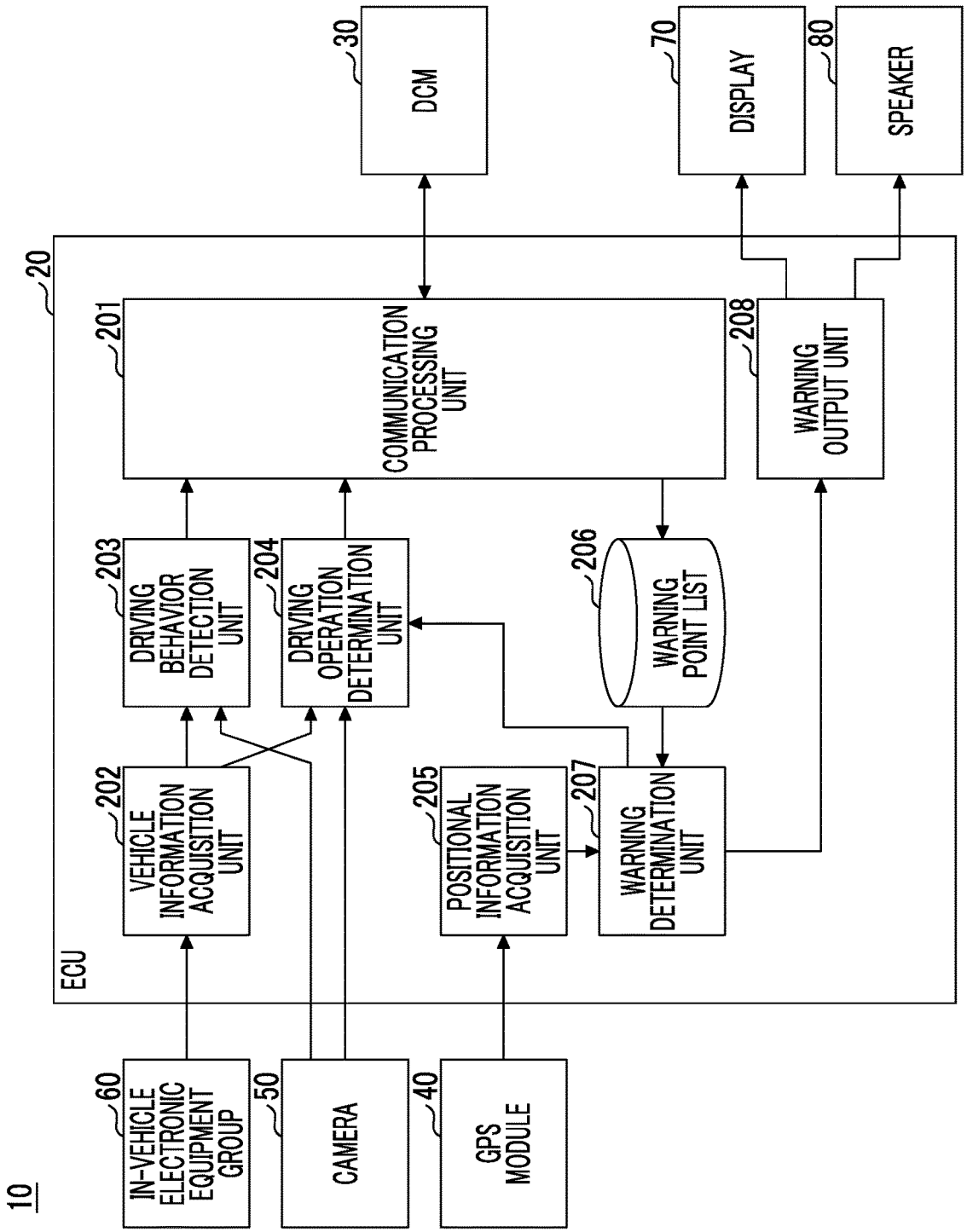
FIG. 2 is a functional block diagram showing an example of the functional configuration of the driving assistance device mounted in a vehicle.
Figure 3:
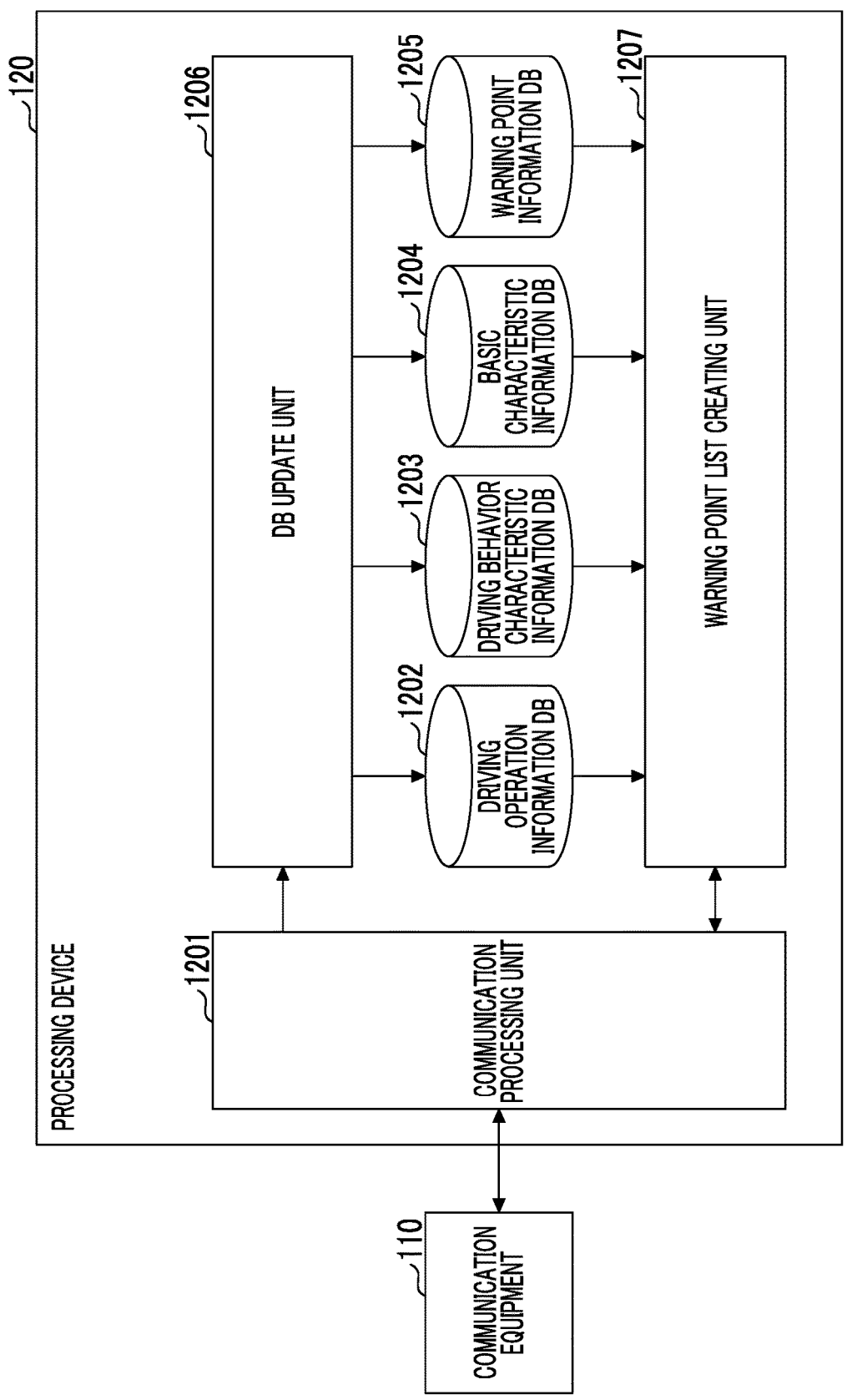
FIG. 3 is a functional block diagram showing an example of the functional configuration of a center server.

First, the configuration of a driving assistance system 1 according to a first embodiment will be described referring to FIGS. 1 to 3.

FIG. 1 is a diagram schematically showing an example of the configuration of the driving assistance system 1 according to the first embodiment. FIG. 2 is a functional block diagram showing an example of the functional configuration of the driving assistance device 10 mounted in a vehicle 5 according to the first embodiment. FIG. 3 is a functional block diagram showing an example of the configuration of a center server 100 according to the first embodiment.

The driving assistance system 1 includes a plurality of vehicles 5, and a center server 100 that is connected to be able to perform communication with each vehicle 5 through a predetermined communication network NW. Hereinafter, a driver of each vehicle 5 is registered in the vehicle 5 (specifically, an internal memory or the like of an ECU 20 described below) and the center server 100 (specifically, an auxiliary storage device or the like of a processing device 120 described below), and description will be provided on an assumption that a plurality of drivers are registered for one vehicle 5.

One vehicle 5 has the same configuration as other vehicles 5 regarding the driving assistance system 1. For this reason, in FIG. 1, solely a detailed configuration mounted in one vehicle 5 is representatively shown.

The driving assistance device 10 is mounted in the vehicle 5.

The driving assistance device 10 includes an electronic control unit (ECU) 20, a data communication module (DCM) 30, a global positioning system (GPS) module 40, a camera 50, an in-vehicle electronic equipment group 60, a display 70, and a speaker 80.

The ECU 20 is an electronic control unit that performs control processing relating to a predetermined function in the vehicle 5.

For example, the ECU 20 acquires vehicle information including information relating to a state (vehicle state) of the vehicle 5, information relating to a state (occupant state) of an occupant of the vehicle 5, and information relating to a state (surrounding state) surrounding the vehicle 5 from the in-vehicle electronic equipment group 60, such as various sensors, various actuators, and various ECUs mounted in the vehicle 5. Then, the ECU 20 uploads the acquired vehicle information or information obtained by performing predetermined processing on the vehicle information to the center server 100 through the DCM 30.

For example, as described below, the ECU 20 performs control processing for outputting, to the driver of the vehicle 5 mounted with the ECU 20, a warning (hereinafter, referred to as a "regulation observance warning") to prompt observance of a predetermined traffic regulation (for example, temporary stop, speed limit, or the like) to be applied when the vehicle 5 passes through a predetermined position in a predetermined direction.

The functions of ECU 20 may be realized by predetermined hardware, software, or a combination thereof. For example, the ECU 20 is constituted centering on a microcomputer including a central processing unit (CPU) 21, a random access memory (RAM) 22, a read only memory (ROM) 23, an auxiliary storage device 24, a real time clock (RTC) 25, and an interface (I/F) 26 for communication connected to one another through a bus 29. The ECU 20 includes, as functional units that are realized by executing one or more programs stored in the ROM 23 or the auxiliary storage device 24, a communication processing unit 201, a vehicle information acquisition unit 202, a driving behavior detection unit 203, a driving operation determination unit 204, a positional information acquisition unit 205, a warning determination unit 207, and a warning output unit 208. The ECU 20 includes a warning point list 206 that is stored in a storage area defined in an internal memory, such as the auxiliary storage device 24.

The functions of the ECU 20 may be shared and realized by a plurality of ECUs.

The communication processing unit 201 performs control such that the DCM 30 performs transmission and reception of various signals, such as an information signal and a control signal, to and from the center server 100.

The vehicle information acquisition unit 202 acquires the vehicle information from the in-vehicle electronic equipment group 60. For example, the vehicle information acquisition unit 202 acquires the vehicle information, such as control signals output from the ECUs of the in-vehicle electronic equipment group 60 connected to one another onto the network bus through a one-to-one communication line or an in-vehicle network, such as a controller area network (CAN), detection signals of the sensors and the actuators under control, and operation signals.

The driving behavior detection unit 203 detects a predetermined driving behavior of the driver. The driving behavior is a behavior of the vehicle 5 that is generated with a driving operation of the driver of the vehicle 5. As a driving behavior to be detected, a vehicle speed (an average vehicle speed during traveling) of the vehicle 5, sudden start (or sudden acceleration), sudden stop (or sudden deceleration), sudden steering, lane change, passing, drift (an operation that a part of the vehicle 5 enters an adjacent lane and returns to an original lane), and the like can be included.

For example, the driving behavior detection unit 203 can calculate the average speed of the vehicle 5 during traveling based on an elapsed time while the vehicle 5 is traveling in one trip of the vehicle 5 and a moving distance while the vehicle 5 is traveling. At this time, the driving behavior detection unit 203 can ascertain the moving distance of the vehicle 5 using a detection value of an odometer, which can be included in the in-vehicle electronic equipment group 60, acquired by the vehicle information acquisition unit 202.

One trip of the vehicle 5 means a period from the start to the stop of the vehicle. The start and the stop of the vehicle 5 include an engine start and an engine stop in a case where an engine is used as a principal power source, an operation to turn on and an operation to turn off an electric power path from a battery to a drive motor in a case of an electric vehicle (power on and power off), and the like.

For example, the driving behavior detection unit 203 can detect sudden start or sudden deceleration based on whether or not an acceleration in a front-rear direction of the vehicle 5 is equal to or greater than a threshold defined in advance. At this time, the driving behavior detection unit 203 can ascertain the acceleration in the front-rear direction of the vehicle 5 using a detection value of an acceleration sensor, which can be included in the in-vehicle electronic equipment group 60, acquired by the vehicle information acquisition unit 202.

For example, the driving behavior detection unit 203 can detect sudden steering based on whether or not a steering angular velocity of the driver of the vehicle 5 is equal to or greater than a threshold defined in advance. At this time, the driving behavior detection unit 203 can ascertain the steering angular velocity using a detection value of a steering angle sensor, which can be included in the in-vehicle electronic equipment group 60, acquired by the vehicle information acquisition unit 202.

For example, the driving behavior detection unit 203 can detect lane change or drift of the vehicle 5 based on captured images in front of the vehicle 5 input from the camera 50. Specifically, the driving behavior detection unit 203 recognizes lanes from captured images of the camera 50 using known image recognition processing and monitors a moving state of white lines of a plurality of captured images acquired in a time series in a right-left direction within the captured images, thereby detecting lane change or drift of the vehicle 5.

For example, the driving behavior detection unit 203 can detect passing of the vehicle 5 based on captured images in front of the vehicle 5 input from the camera 50. Specifically, the driving behavior detection unit 203 recognizes lanes and vehicles in front of the vehicle 5 from the captured images of the camera 50 like lane change. Then, the driving behavior detection unit 203 monitors a moving state of white lines of a plurality of captured images acquired in a time series in a right-left direction within the captured images and a moving state of preceding vehicles in an up-down direction within the captured images, thereby detecting passing of the vehicle 5.

The driving behavior detection unit 203 generates driving behavior information relating to a driving behavior detected during one trip of the vehicle 5, for example, at the time of the stop of the vehicle 5 and transmits the driving behavior information to the center server 100 through the communication processing unit 201.

For example, the driving behavior detection unit 203 generates, as the driving behavior information traveling average speed information during traveling relating to an average speed in a state in which the vehicle 5 is traveling during one trip from the start to the stop of the vehicle 5.

For example, the driving behavior detection unit 203 generates, as the driving behavior information, sudden start frequency information including a total start frequency during one trip from the start to the stop of the vehicle 5 and a sudden start frequency in the total start frequency.

For example, the driving behavior detection unit 203 generates, as the driving behavior information, sudden stop frequency information including a total stop frequency during one trip from the start to the stop of the vehicle 5 and a sudden stop frequency in the total stop frequency.

For example, the driving behavior detection unit 203 generates, as the driving behavior information, lane change frequency information, passing frequency information, and drift frequency information including a lane change frequency, a passing frequency, and a drift frequency during one trip from the start to the stop of the vehicle 5.

In a case where a plurality of drivers is registered in the ECU 20 and the center server 100 for the host vehicle 5, the driving behavior detection unit 203 transmits the driving behavior information including information (for example, a driver identifier (ID) or the like as identification information defined in advance for each registered driver) for specifying a driver during present one trip to the center server 100. With this, the center server 100 can generate and store driving behavior characteristic information described below for each of the drivers of the same vehicle 5. In this case, the driving behavior detection unit 203 may specify a current driver from among the registered drivers according to a driver's predetermined operation (for example, an operation on a predetermined operation screen displayed on the display 70) for selecting a driver. In addition, the driving behavior detection unit 203 may specify the current driver from among the registered drivers based on a detection value of a sensor that can be included in the in-vehicle electronic equipment group 60 and detects a weight of an occupant on a driver's seat, a sensor that can be included in the in-vehicle electronic equipment group 60 and detects a slide position of a driver's seat, or the like.

The driving operation determination unit 204 determines whether or not the driver of the vehicle 5 observes a traffic regulation at a predetermined target point or target range (hereinafter, simply referred to as a "warning point") when the vehicle 5 to be a target of a regulation observance warning passes through in a predetermined direction. As a traffic regulation to be a target, "temporary stop", "speed limit", "no passing", "no entry into priority lane (for example, bus priority lane)", "slow", and the like can be included.

For example, the driving operation determination unit 204 can determine whether or not a traffic regulation of temporary stop is observed based on whether or not the vehicle 5 is stopped and then started. Specifically, the driving operation determination unit 204 monitors the vehicle speed of the vehicle 5 based on a detection value of a vehicle speed sensor, which can be included in the in-vehicle electronic equipment group 60, acquired by the vehicle information acquisition unit 202, thereby determining whether or not the traffic regulation of temporary stop is observed.

For example, the driving operation determination unit 204 monitors the vehicle speed of the vehicle 5 based on the detection value of the vehicle speed sensor, which can be included in the in-vehicle electronic equipment group 60, acquired by the vehicle information acquisition unit 202, thereby determining whether or not a traffic regulation of speed limit or slow is observed.

For example, the driving operation determination unit 204 monitors the presence or absence of lane change of the vehicle 5 based on the captured images of the camera 50, thereby determining whether or not a traffic regulation of no passing is observed.

For example, the driving operation determination unit 204 monitors a lane on which the vehicle 5 is traveling based on the captured images of the camera 50, thereby determining whether or not a traffic regulation of no entry into priority lane is observed.

For example, at the time of the stop of the vehicle 5, the driving operation determination unit 204 generates regulation observance information including all determination results during one trip of the vehicle 5 and transmits the regulation observance information to the center server 100 through the communication processing unit 201.

Like the driving behavior detection unit 203, in a case where a plurality of drivers is registered in the ECU 20 or the like for the host vehicle 5, the driving operation determination unit 204 transmits regulation observance information including information for specifying a driver of present one trip to the center server 100. With this, the center server 100 can generate and store driving operation information for each of the drivers of the same vehicle 5.

The positional information acquisition unit 205 acquires positional information of the vehicle 5 input from the GPS module 40.

The warning point list 206 is a list that specifies a position of a warning point surrounding the position of the vehicle 5, a passing direction (hereinafter, referred to as a "target passing direction") of a vehicle to be an application target of a traffic regulation, a type of a traffic regulation to be a target, and the like. In the warning point list 206, information indicating the presence or absence of warning output through the warning output unit 208 described below is included for each warning point whose position is specified in the list. The warning point list 206 is transmitted from the center server 100 to the vehicle 5 according to an inquiry of a warning point list transmitted from the vehicle 5 (driving assistance device 10) to the center server 100 and is received (acquired) by the communication processing unit 201 (an example of an information acquisition unit). Update processing of the warning point list 206 in the ECU 20 will be described below (see FIG. 6).

In a case where a plurality of drivers is registered in the ECU 20 or the like for the vehicle 5, information for specifying the current driver of the vehicle 5 is included in the inquiry of a warning point list transmitted from the vehicle 5 (driving assistance device 10) to the center server 100. With this, as described below, the center server 100 can create a warning point list in conformity with the current driver of the vehicle 5 regarding a predetermined characteristic. That is, the driving assistance device 10 of the vehicle 5 can acquire a warning point list in conformity with the current driver regarding the predetermined characteristic.

Figures 4A, 4B:
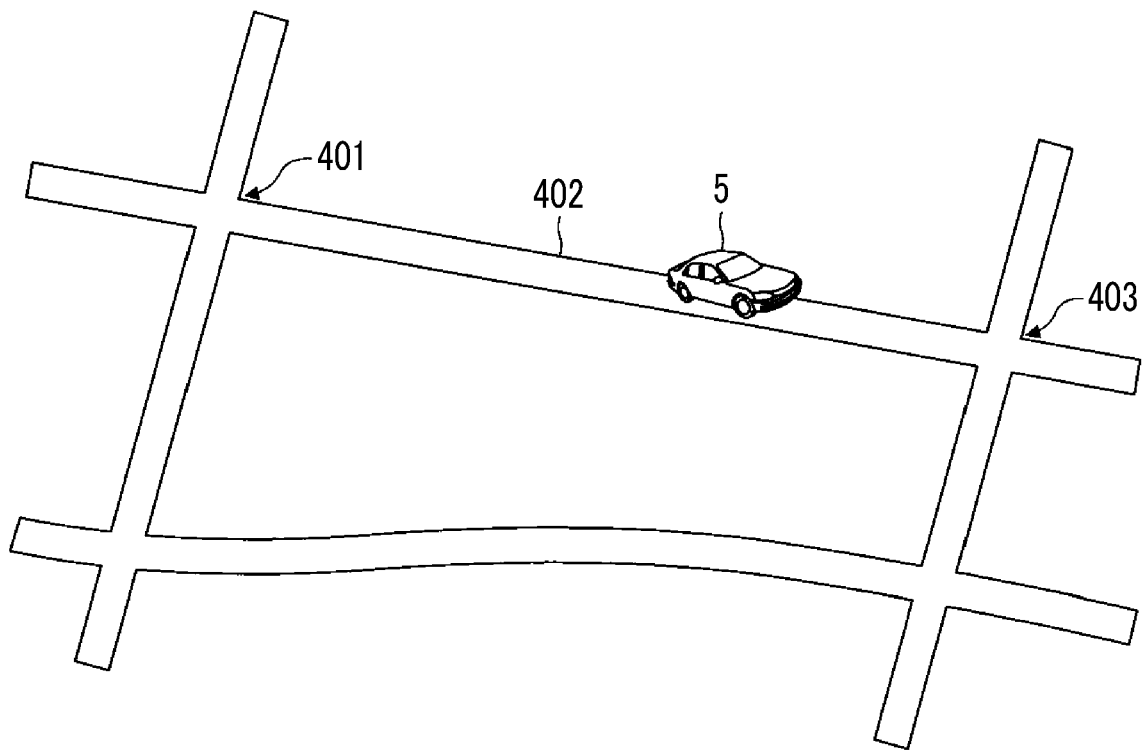
FIG. 4A is a table illustrating a warning point list.
FIG. 4B is a diagram illustrating the warning point list.

For example, FIGS. 4A and 4B are a diagram illustrating a warning point list. Specifically, FIG. 4A shows a table showing an example of a warning point list. FIG. 4B is a diagram illustrating a position of a warning point and a target passing direction specified by a warning point list. Hereinafter, description will be provided on an assumption that identification information (node ID) is assigned for each node corresponding to an intersection in a road network of a target area (for example, the whole of Japan, the inside of a specific prefecture, or the like), and identification information (link ID) is assigned for each link corresponding to a road section connecting adjacent intersections.

As shown in FIG. 4A, in the warning point list, a point ID as identification information defined in advance for each warning point, identification information ("1" to "3") indicating a type (regulation type) of a traffic regulation to be applied to the vehicle 5 at the warning point corresponding to the point ID, information for specifying a position of the warning point, information for specifying a target passing direction of the warning point, and information relating to the presence or absence of warning output at the warning point corresponding to the point ID are included.

In a case where the regulation type is temporary stop ("1"), information for specifying the position of the warning point includes a node ID of a node corresponding to an intersection to be a target of a traffic regulation. In a case where the regulation type is temporary stop ("1"), information for specifying the target passing direction of the warning point includes a node ID (hereinafter, referred to as a "source node ID") of a node (hereinafter, referred to as a "source node") corresponding to an intersection (last intersection) of an entry source that defines an entry direction to an intersection.

In a case where the regulation type is speed limit ("2") or no passing ("3"), information for specifying a position of a warning point includes a link ID of a link corresponding to a road section to be a target of a traffic regulation. In a case where the regulation type is speed limit ("2") or no passing ("3"), information for specifying a target passing direction of a warning point includes a node ID (source node ID) of a source node corresponding to an intersection of an entry source that defines an entry direction to the road section. In a case where the regulation type is speed limit ("2") or no passing ("3"), information for specifying a position of a warning point includes a distance from an intersection (source node) of an entry source to a road section to be a target of a traffic regulation that specifies a point of specific warning output in the road section.

For example, as shown in FIG. 4B, in a case where "temporary stop" is applied to a vehicle that enters an intersection 403 from a road section 402, the intersection 403 corresponds to a node to be a target of a traffic regulation, and an intersection 401 of another end of the road section 402 corresponds to a source node. For example, in a case where "no passing" is applied to a vehicle that passes through the road section 402 from the intersection 401 toward the intersection 403, the road section 402 corresponds to a link to be a target of a traffic regulation, and the intersection 401 of an entry source to the road section 402 corresponds to a source node.

Returning to FIG. 2, the warning determination unit 207 (an example of a determination unit) determines whether or not to output a regulation observance warning at a warning point before the vehicle 5 passes through the warning point in the warning point list 206 in a target passing direction corresponding to the warning point. At this time, the warning determination unit 207 determines whether or not the vehicle 5 arrives near the warning point in a manner of passing through the warning point in the target passing direction based on positional information of the vehicle 5 acquired by the positional information acquisition unit 205.

Specifically, the warning determination unit 207 determines whether or not to output a regulation observance warning at the warning point based on information relating to the presence or absence of warning output at the warning point included in the warning point list 206. With this, warning determination unit 207 should merely confirm the presence or absence of warning output of the warning point in the warning point list and can determine whether or not to output a regulation observance warning at the warning point with simple processing.

The warning output unit 208 outputs the regulation observance warning by display or sound through the display 70 or the speaker 80 based on a determination result in the warning determination unit 207. That is, in a case where the warning determination unit 207 determines to output a warning, the warning output unit 208 outputs the warning through the display 70 and the speaker 80, and in a case where the warning determination unit 207 determines not to output a warning, the warning output unit 208 does not output the regulation observance warning.

The DCM 30 is, for example, a communication device that performs bidirectional communication with the center server 100 through the predetermined communication network NW including a mobile phone network with multiple base stations as terminals, an Internet network, or the like. The DCM 30 is connected to perform communication with various ECUs including the ECU 20 through an in-vehicle network, such as a CAN.

The GPS module 40 receives GPS signals transmitted from three or more satellites, preferably, four or more satellites above the vehicle 5 and measures the position of the vehicle 5 mounted with the GPS module 40. The GPS module 40 is connected to perform communication with the ECU 20 and the like through a one-to-one communication line or an in-vehicle network, such as a CAN, and the measured positional information of the vehicle 5 is input to the ECU 20 and the like.

The camera 50 captures a predetermined capturing range in front of the vehicle 5. The camera 50 is attached to a central upper end on the vehicle cabin side of a windshield of the vehicle 5, that is, a right-left central portion of a front header on the vehicle cabin side of the vehicle 5. The camera 50 is activated, for example, with ignition-on (IG-ON) of the vehicle 5, and captures a predetermined capturing range in front of the vehicle 5 in a predetermined period, for example, at every 1/30 seconds until IG-OFF of the vehicle 5 after activation. The camera 50 is connected to perform communication with the ECU 20 and the like through a one-to-one communication line or an in-vehicle network, such as a CAN, and captured images of the camera 50 are input to the ECU 20 and the like.

As described above, the in-vehicle electronic equipment group 60 includes various sensors that output vehicle information, various actuators, various ECUs, and the like. As described above, the in-vehicle electronic equipment group 60 and the ECU 20 are connected to perform communication with each other directly or indirectly, for example, through an in-vehicle network, such as a CAN, and the in-vehicle electronic equipment group 60 outputs various signals corresponding to the vehicle information on a bus of the in-vehicle network. With this, the ECU 20 (vehicle information acquisition unit 202) can acquire various signals corresponding to the vehicle information output on the bus of the in-vehicle network.

The display 70 displays various information images. The display 70 is, for example, a liquid crystal display, an organic electroluminescence (EL) display, or the like, and may be of a touch panel type doubling as an operating unit. The display 70 is provided at a place easily visible by a user inside the vehicle cabin of the vehicle 5, in particular, a driver, for example, in an upper portion near the center in a right-left direction of an instrument panel.

The speaker 80 is a known sound output device that outputs sound. The speaker 80 is embedded, for example, in such a manner that a principal sound output unit is exposed from the instrument panel or a door trim inside the vehicle cabin of the vehicle 5.

The center server 100 (an example of an information processing device and a server) collects the driving behavior information and the driving operation information from the vehicles 5. The center server 100 includes communication equipment 110 and a processing device 120.

The functions of the center server 100 may be shared and realized by a plurality of servers.

The communication equipment 110 performs bidirectional communication with each vehicle 5 through the communication network NW.

The processing device 120 performs various kinds of control processing in the center server 100. The functions of the processing device 120 may be realized by predetermined hardware, software, or a combination thereof. Like the ECU 20, the processing device 120 is constituted, for example, centering on one or a plurality of server computers including a CPU, a RAM, a ROM, an auxiliary storage device, an RTC, a communication interface, and the like. The processing device 120 includes, for example, a communication processing unit 1201, a DB update unit 1206, and a warning point list creation unit 1207 as functional units that are realized by one or more programs stored in the ROM or the auxiliary storage device being executed on the CPU. The processing device 120 includes a driving operation information DB 1202, a driving behavior characteristic information DB 1203, a basic characteristic information DB 1204, and a warning point information DB 1205 that are constructed in storage areas defined in the auxiliary storage device of the server computer or an external storage device connected to the server computer, for example.

The driving operation information DB 1202, the driving behavior characteristic information DB 1203, and the basic characteristic information DB 1204 may be constructed as a database integrating these DBs in a part or in whole.

The communication processing unit 1201 performs control such that the communication equipment 110 performs exchange of various signals, such as control signals or information signals, with each vehicle 5.

The driving operation information DB 1202 (an example of a regulation observance information storage unit) stores information (driving operation information) relating to an observance tendency relating to a traffic regulation corresponding to each warning point of each of the drivers of the vehicles 5, that is, each of the drivers (hereinafter, referred to as a "registered driver") registered in advance in the auxiliary storage device or the like. The driving operation information DB 1202 is updated by the DB update unit 1206 based on the regulation observance information successively received from the vehicles 5 by the communication processing unit 1201. Specifically, in the driving operation information DB 1202, information relating to the observance tendency relating to the traffic regulation for each warning point is associated with identification information (hereinafter, referred to as "driver ID") of each registered driver. Information relating to the observance tendency relating to the traffic regulation is, for example, information relating to whether or not a past observance ratio relating to the traffic regulation based on the regulation observance information is equal to or greater than a predetermined reference.

For example, FIG. 5 is a diagram showing an example of the driving operation information DB 1202. Specifically, FIG. 5 represents the driving operation information stored in the driving operation information DB 1202 in a table format.

As shown in FIG. 5, in the driving operation information DB 1202, information relating to an observance tendency relating to a traffic regulation corresponding to each warning point pl (l=1, 2, . . . , L, . . . ) is associated with a registered driver Dm (m=1, 2, 3, . . . , M (where M is the total number of registered drivers)). Specifically, in the driving operation information DB 1202, as information relating to an observance tendency relating to a traffic regulation, information relating to whether or not an observance ratio relating to a traffic regulation based on past regulation observance information is equal to or greater than a predetermined reference is defined. Specifically, in the example, a case where a past observance ratio relating to a traffic regulation based on regulation observance information is equal to or greater than a predetermined reference is indicated by "O", and a case where the past observance ratio relating to the traffic regulation is less than the predetermined reference is indicated by "x".

Information relating to an observance tendency relating to a traffic regulation may be defined, for example, in three or more stages (for example, "O", "Δ", "x", and the like in a descending order of a past observance ratio relating to the traffic regulation) according to a plurality of predetermined references. Information relating to an observance tendency relating to a traffic regulation may be specifically a numerical value (for example, "60%" or the like) of a past observance ratio relating to the traffic regulation. The driving operation information DB 1202 may be defined as a database that is different for each type of traffic regulation.

Returning to FIG. 3, the driving behavior characteristic information DB 1203 (an example of a driver characteristic information storage unit) stores information (driving behavior characteristic information) relating to characteristics of a driving behavior of each of the drivers of the vehicles 5, that is, each of the registered drivers. The driving behavior characteristic information DB 1203 is updated by the DB update unit 1206 based on the driving behavior information successively received from the vehicles 5 by the communication processing unit 1201. Specifically, in the driving behavior characteristic information DB 1203, characteristic information (characteristic value) corresponding to each characteristic item relating to a driving behavior defined in advance is associated with the driver ID corresponding to each registered driver. The characteristic items relating to the driving behavior can include an average speed of the vehicle 5, a frequency of sudden start, a frequency of sudden stop, a frequency of sudden steering, a frequency of lane change, a frequency of passing, a frequency of drift, and the like.

For example, FIG. 6 is a diagram showing an example of the driving behavior characteristic information DB 1203. Specifically, FIG. 6 represents the driving behavior characteristic information stored in the driving operation information DB 1202 in a table format. In the example, as the characteristic items relating to the driving behavior, the average speed of the vehicle 5, the frequency of sudden start and sudden stop, and the frequency of sudden steering are employed.

In the example, the average vehicle speed indicates a past average vehicle speed in a traveling state of the vehicle 5 driven by each registered driver that is ascertained based on the driving behavior information. The frequency of sudden start and sudden stop indicates the ratio (percentage) of the frequency of sudden start and sudden stop to all opportunities (frequency) of start and stop of the vehicle 5 driven by registered driver that is ascertained based on the driving behavior information. The frequency of sudden steering indicates the ratio (percentage) of the frequency of sudden steering to all opportunities (frequency) of steering of the vehicle 5 driven by each registered driver that is ascertained based on the driving behavior information.

As shown in FIG. 6, in the driving behavior characteristic information DB 1203, characteristic information (characteristic value) for each of the average vehicle speed, the frequency of sudden start and sudden stop, and the frequency of sudden steering as a characteristic item is associated with each registered driver Dm.

Returning to FIG. 3, the basic characteristic information DB 1204 (an example of a driver characteristic information storage unit) stores information (basic characteristic information) relating to basic characteristics of each of the drivers of the vehicles 5, that is, each of the registered drivers. The basic characteristics of the driver can include basic attributes of the driver, such as age and sex of the driver. The basic characteristics of the driver include the number of years of experience (the number of years of driving) of the driver driving the vehicle or characteristics relating to a driving experience of the driver, such as a distance (traveling distance) when the driver has driven the vehicle for the number of years of driving. Specifically, in the basic characteristic information DB 1204, the characteristic information for each of the characteristic items relating to the basic attribute and the characteristic items relating to the driving experience is associated with the driver ID corresponding to each registered driver. The basic characteristic information DB 1204 is updated by the DB update unit 1206.

For example, FIG. 7 is a diagram showing an example of the basic characteristic information DB 1204. Specifically, the basic characteristic information stored in the basic characteristic information DB 1204 is represented in a table format. In the example, the age and the sex of the driver are employed as the characteristic items relating to the basic attribute, and the number of years of driving of the traveling distance of the driver are employed as the characteristic items relating to the driving experience.

As shown in FIG. 7, in the basic characteristic information DB 1204, characteristic information (characteristic value) for each of the age, the sex, the number of years of driving, and the traveling distance as the characteristic items is associated with each registered driver Dm.

Returning to FIG. 3, the warning point information DB 1205 stores information (warning point information) relating to each warning point. Specifically, in the warning point information DB 1205, information for specifying the position of the warning point or information for specifying the type (regulation type) of corresponding traffic regulation is associated with identification information (point ID) of each warning point to be registered. The warning point information DB 1205 is updated by the DB update unit 1206.

For example, FIG. 8 is a diagram showing an example of the warning point information DB 1205. Specifically, FIG. 8 represents the warning point information stored in the warning point information DB 1205 in a table format.

As shown in FIG. 8, the identification information ("1" to "3") indicating the regulation type, information for specifying the position of the warning point, and information (a node ID, a source node ID, a link ID, and a distance from a source node) for specifying a target passing direction of the warning point are associated with each point ID corresponding to each warning point.

Returning to FIG. 3, the DB update unit 1206 performs update processing of the driving operation information DB 1202, the driving behavior characteristic information DB 1203, the basic characteristic information DB 1204, and the warning point information DB 1205.

For example, the DB update unit 1206 updates the driving operation information DB 1202 through batch processing based on regulation observance information successively acquired from the vehicles 5 by the communication processing unit 1201.

For example, the DB update unit 1206 updates the driving behavior characteristic information DB 1203 through batch processing based on the driving behavior information successively acquired from the vehicles 5 by the communication processing unit 1201.

For example, the DB update unit 1206 may update the age or the number of years of driving of the driver registered in the basic characteristic information DB 1204 through batch processing based on information, such as a birthday or a driver's license date of the driver registered in advance by an owner of each vehicle 5, a dealer who has sold the vehicle 5, or the like. The DB update unit 1206 may acquire a moving distance per trip from each vehicle 5 through the communication processing unit 1201 and may update the traveling distance of the driver registered in the basic characteristic information DB 1204 through batch processing based on the moving distance. The DB update unit 1206 may update the traveling distance by estimating the traveling distance based on initial information of the traveling distance registered in advance by an owner of each vehicle 5, the number of years of driving, or the like.

For example, the DB update unit 1206 performs update by adding a warning point to be newly registered in the warning point information DB 1205 or deleting a warning point to be repealed according to an operation input from an administrator of the center server 100.

In a case where an inquiry of a warning point list is received from the vehicle 5 by the communication processing unit 1201, the warning point list creation unit 1207 creates a warning point list and transmits the warning point list to the vehicle 5 as a transmission source of the inquiry through the communication processing unit 1201. Hereinafter, a creation method of a warning point list will be described on an assumption of the driving operation information DB 1202, the driving behavior characteristic information DB 1203, and the basic characteristic information DB 1204 of FIGS. 5 to 7 described above.

First, the warning point list creation unit 1207 (an example of an extraction unit) extracts a driver (similar driver) of another vehicle 5 similar in a predetermined characteristic to a driver of the vehicle 5 (hereinafter, referred to as a "target vehicle") to be a target of warning point list creation. At this time, as described above, the warning point list creation unit 1207 confirms information (driver ID or the like) for specifying the driver that can be included in the inquiry of the warning point list, thereby ascertaining a driver (hereinafter, referred to as a "target driver") to be a target from a plurality of drivers registered for the vehicle 5.

For example, the warning point list creation unit 1207 calculates a degree of similarity between the target driver and each of the registered drivers other than the target driver regarding a plurality of characteristic items (average speed, frequency of sudden start and sudden stop, frequency of sudden steering, age, sex, the number of years of driving, traveling distance, and the like) defined in the driving behavior characteristic information DB 1203 and the basic characteristic information DB 1204. Hereinafter, an example of the degree of similarity is described.

$$W_i = \sum_{k=1}^{N} \{\delta_k \times |x_{ki} - \theta_k|\} \quad (1)$$

i (i=1, . . . , I. I is an integer equal to or greater than 2 and corresponds to a value obtained by subtracting 1 from the number of registered drivers) is a driver number that is numbered in advance for each registered driver other than the target driver in a manner of no duplication. k (k=1, . . . , K. K is an integer equal to or greater than 2, and in the example, 7) is an item number that is numbered in advance for each characteristic item to be a target in a manner of no duplication. xki is a numerical value (characteristic value) of a characteristic item corresponding to the item number k of a registered driver corresponding to the driver number i. θk is a numerical value (characteristic value) of a characteristic item corresponding to the item number k of the target driver. δk is a coefficient (influence coefficient) that adjusts influence of each characteristic item. With this, since the numerical values of the characteristic items are different in unit or the like, it is possible to adjust influence on similarity due to the difference in unit or the like, and to strengthen or weaken influence on similarity for each characteristic item.

As shown in Expression (1), the degree of similarity Wi is represented by the total sum of values obtained by multiplying the difference between the characteristic value of the target driver and the characteristic value of the registered driver other than the target driver in each characteristic item by the influence coefficient of the corresponding characteristic item. In the example, the warning point list creation unit 1207 can determine that the driver of the target vehicle is similar in the defined characteristic item to another driver when the degree of similarity is smaller.

The warning point list creation unit 1207 may extract, as a similar driver, a registered driver having the minimum degree of similarity to the target driver among the registered drivers other than the target driver. The warning point list creation unit 1207 may extract, as a similar driver, one or a plurality of registered drivers having the degree of similarity to the target driver equal to or less than a predetermined threshold among the registered drivers other than the target driver.

For example, it is assumed that the influence coefficients ai to the characteristic items of the average speed, the frequency of sudden start and sudden stop, the frequency of sudden steering, the age, the sex, the number of years of driving, and the traveling distance are set to "100", "100", "100", "50", "100", "100", and "0.01", respectively, and the target driver is a driver DM. At this time, in a case where the warning point list creation unit 1207 calculates similarities of drivers D1 to D3 to the driver DM, the similarities become "7718", "3630", and "14700", respectively. Accordingly, in a case where a registered driver having the minimum degree of similarity to the target driver is extracted as a similar driver, the warning point list creation unit 1207 can extract the driver D2 as a similar driver.

Subsequently, the warning point list creation unit 1207 extracts warning points near the target vehicle (for example, within 5 km) from the warning point information DB 1205 based on positional information of the target vehicle included in an inquiry from the target vehicle.

Subsequently, the warning point list creation unit 1207 (an example of a determination unit) determines the presence or absence of output of a regulation observance warning for each extracted warning point based on an observance tendency of the similar driver relating a traffic regulation. Specifically, the warning point list creation unit 1207 creates a warning point list by determining the presence or absence of warning output at the extracted warning points while referring to the presence or absence of past observance of the similar driver relating to the traffic regulations relating to the extracted warning points in the driving operation information of the similar driver stored in the driving operation information DB 1202 (see FIG. 4A).

For example, as shown in FIG. 5, the driver DM of the target vehicle has not passed near a warning point pL in the past, there is no information relating to an observance tendency relating to a traffic regulation to the warning point pL. Meanwhile, since the driver D2 as a similar driver has passed near the warning point pL in the past, as information relating to the observance tendency relating to the traffic regulation to the warning point pL, "x" indicating that a past observance ratio relating to the traffic regulation based on the regulation observance information is less than a predetermined reference is stored. Accordingly, the warning point list creation unit 1207 can determine that, similarly, the driver DM of the target vehicle is highly likely not to observe the traffic regulation at the warning point pL based on the observance tendency of the driver D2 relating to the traffic regulation as a similar driver to the warning point pL. That is, the warning point list creation unit 1207 can determine the presence of the output of the regulation observance warning of the warning point pL where the driver DM (target driver) of the target vehicle has had no experience passing through in the past based on the observance tendency of the driver D2 (similar driver) relating to the traffic regulation at the warning point pL.

For example, in a case where a plurality of similar drivers is extracted, the warning point list creation unit 1207 integrally determines a past observance tendency of each similar driver relating to a traffic regulation and a warning point to be a target and determines the presence or absence of output of a regulation observance warning to the target driver at each extracted warning point. Specifically, the warning point list creation unit 1207 may calculate a past observance ratio of all similar drivers relating to a traffic regulation and a warning point to be a target and may determine the presence or absence of output of a regulation observance warning to the driver of the target vehicle at each extracted warning point based on the calculated observance ratios. At this time, warning point list creation unit 1207 may calculate the past observance ratio of all similar drivers relating to the traffic regulation taking into consideration the number of times of passing through a warning point to be a target for each similar driver. The number of times of passing through the warning point can be stored separately.

For example, in a case where the target driver has had experience passing through a warning point to be a target, that is, there is information relating to the observance tendency relating to the traffic regulation and the warning point in the driving operation information of the target driver, the warning point list creation unit 1207 takes the information into consideration. That is, the warning point list creation unit 1207 may integrally determine the past observance tendencies of both of the driver of the target vehicle and the similar driver relating to the traffic regulation and the warning point to be a target and may determine the presence or absence of the output of the regulation observance warning to the driver of the target vehicle at each extracted warning point. Specifically, the warning point list creation unit 1207 may calculate the past observance ratio of the driver of the target vehicle and all similar drivers relating to the traffic regulation and the warning point to be a target and may determine the presence or absence of the output of the regulation observance warning to the driver of the target vehicle for each extracted warning point based on the calculated observance ratio. At this time, the warning point list creation unit 1207 may calculate the past observance ratio of all similar drivers relating to the traffic regulation taking into consideration the number of times of passing through the warning point to be a target of each of the driver of the target vehicle and the similar drivers. The number of times of passing through the warning point can be stored separately.

Finally, the warning point list creation unit 1207 transmits the created warning point list to the vehicle 5 (target vehicle) as a transmission source of the inquiry through the communication processing unit 1201.

Details of Operation of Driving Assistance System

Next, details of the operation of the driving assistance system 1 will be described referring to FIGS. 9 to 11.

Figure 9:
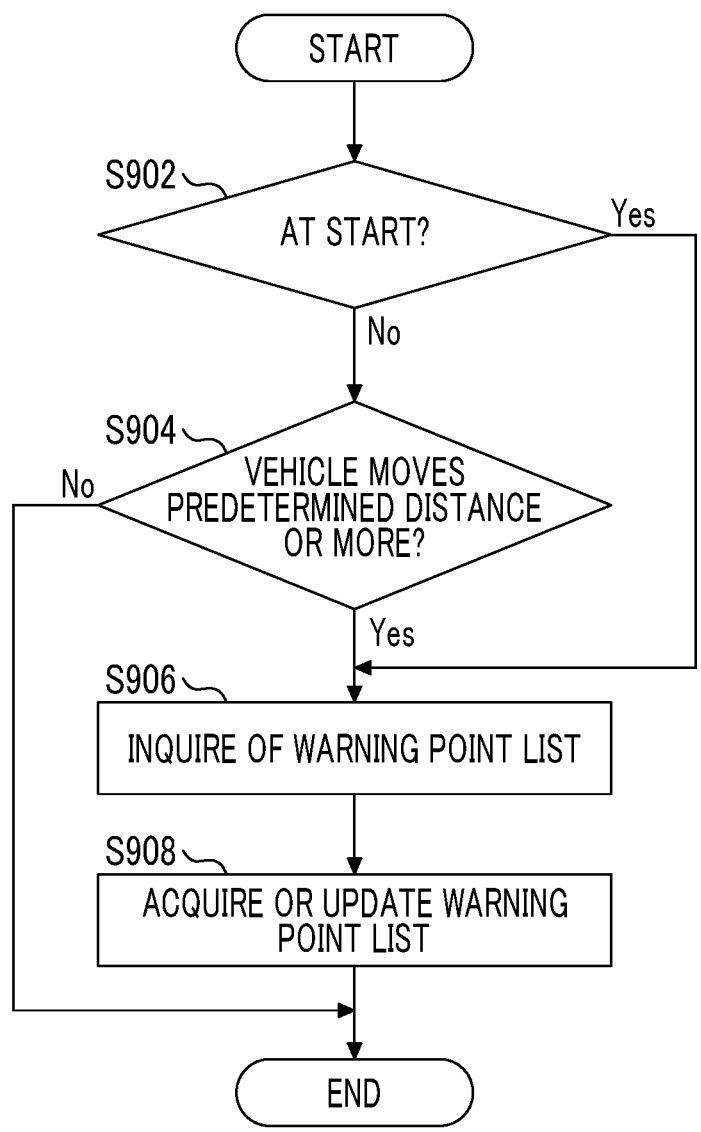
FIG. 9 is a flowchart schematically showing an example of warning point list acquisition processing in the driving assistance device.

First, FIG. 9 is a flowchart schematically showing an example of warning point list acquisition processing in the driving assistance device 10 of the vehicle 5. The processing of the flowchart is repeatedly executed at each predetermined time, for example, from the start (specifically, after initial processing of the ECU 20 ends at the time of the start of the vehicle 5) to the stop of the vehicle 5. The same applies to FIG. 10 described below.

In Step S902, the ECU 20 determines whether or not the vehicle 5 is at start, that is, whether or not a first processing flow after the start of the vehicle 5 is executed. The ECU 20 progresses to Step S906 in a case where the vehicle 5 is at start, and progresses to Step S904 in a case where the vehicle 5 is not at start.

In Step S904, the ECU 20 determines whether or not the vehicle 5 moves a predetermined distance (for example, a given value of about several km) or more from a previous inquiry of the warning point list. As described above, the ECU 20 can ascertain the moving distance of the vehicle 5 using the detection value of the odometer, which can be included in the in-vehicle electronic equipment group 60, acquired by the vehicle information acquisition unit 202. The ECU 20 progresses to Step S906 in a case where the vehicle 5 moves the predetermined distance or more from the previous inquiry of the warning point list, and ends the present processing otherwise.

In Step S906, the ECU 20 (communication processing unit 201) transmits the inquiry of the warning point list including the current positional information of the vehicle 5 to the center server 100 through the DCM 30. At this time, the ECU 20 can acquire the positional information of the vehicle 5 from the GPS module 40 with the positional information acquisition unit 205. In a case where a plurality of drivers is registered in the ECU 20 and the like, the ECU 20 transmits an inquiry further including information (for example, the driver ID or the like) for specifying the current driver.

In Step S908, the ECU 20 (communication processing unit 201) acquires the warning point list from the center server 100 through the DCM 30, updates the warning point list 206, and ends the present processing.

In a case where the warning point list is not returned from the center server 100 even though a predetermined time has elapsed from transmission of the inquiry of the warning point list for any reason, such as a fault of the communication network NW, the ECU 20 may retransmit the inquiry of the warning point list.

Figure 10:
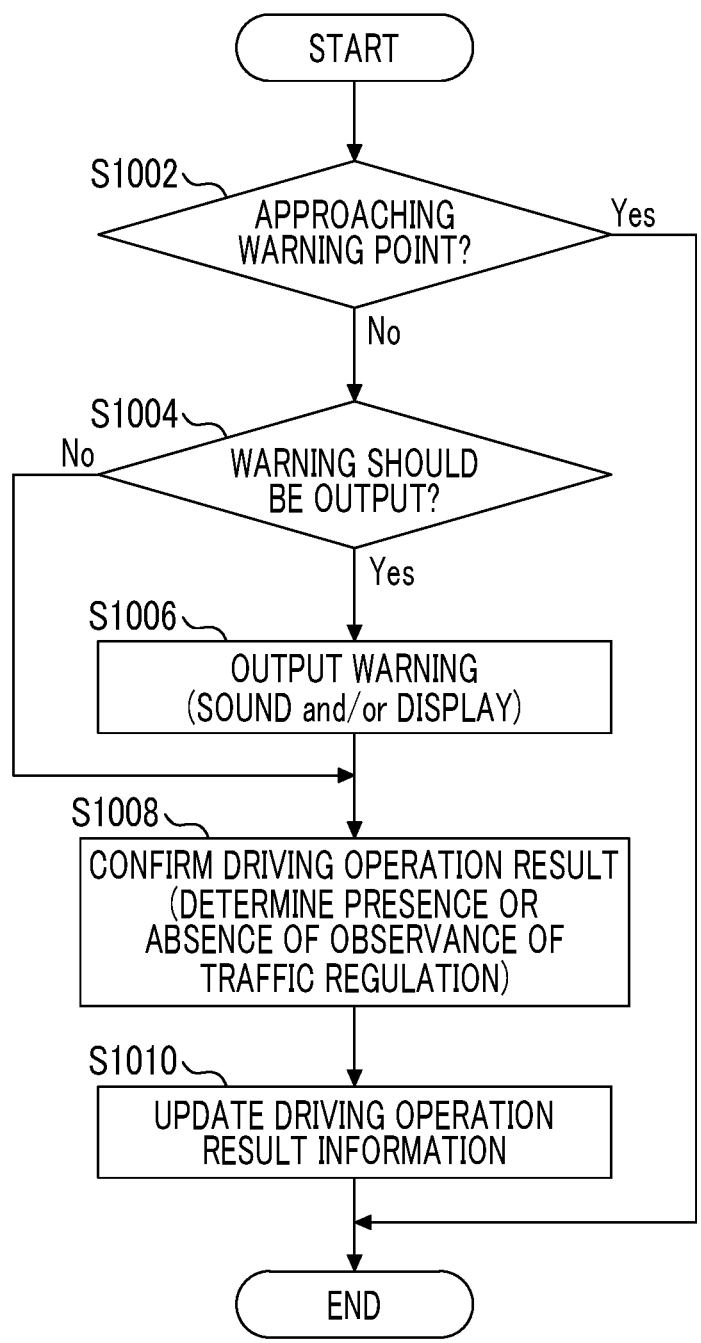
FIG. 10 is a flowchart schematically showing an example of warning output processing in the driving assistance device.

Subsequently, FIG. 10 is a flowchart schematically showing an example of processing (warning output processing) relating to output of a regulation observance warning in the driving assistance device 10.

In Step S1002, the warning determination unit 207 determines whether or not the vehicle 5 is approaching a warning point in a manner of passing through the warning point in the target passing direction based on the positional information of the vehicle 5 acquired by the positional information acquisition unit 205 and the warning point list 206. The warning determination unit 207 progresses to Step S1004 in a case where the vehicle 5 is approaching the warning point in a manner of passing through the warning point in the target passing direction, and ends the present processing otherwise.

In Step S1004, the warning determination unit 207 determines whether or not a regulation observance warning should be output at a warning point where the vehicle 5 is approaching based on the warning point list 206. Specifically, as described above, the warning determination unit 207 determines the presence or absence of the regulation observance warning using information relating to the presence or absence of the regulation observance warning at a warning point to be a target included in the warning point list 206. The warning determination unit 207 progresses to Step S1006 in a case where the regulation observance warning should be output at the warning point where the vehicle 5 is approaching, and progresses to Step S1008 otherwise.

In Step S1006, the warning output unit 208 outputs the regulation observance warning by at least one of display and sound through the display 70 or the speaker 80.

The warning output unit 208 may perform control such that the display 70 or the speaker 80 stops the output of the regulation observance warning in a case where the vehicle 5 has passed through the warning point to be a target after the start of the output of the regulation observance warning, in a case where an elapsed time from the start of the output has elapsed a predetermined time, or the like.

In Step S1008, the driving operation determination unit 204 determines whether or not the corresponding traffic regulation is observed at the warning point. Specifically, the driving operation determination unit 204 determines whether or not the traffic regulation is observed using a method according to the type (regulation type) of the traffic regulation corresponding to the warning point to be a target specified through the processing of the warning determination unit 207.

In Step S1010, the driving operation determination unit 204 updates the regulation observance information of the present trip (from the present start of the vehicle 5 until now) and ends the present processing.

Figure 11:
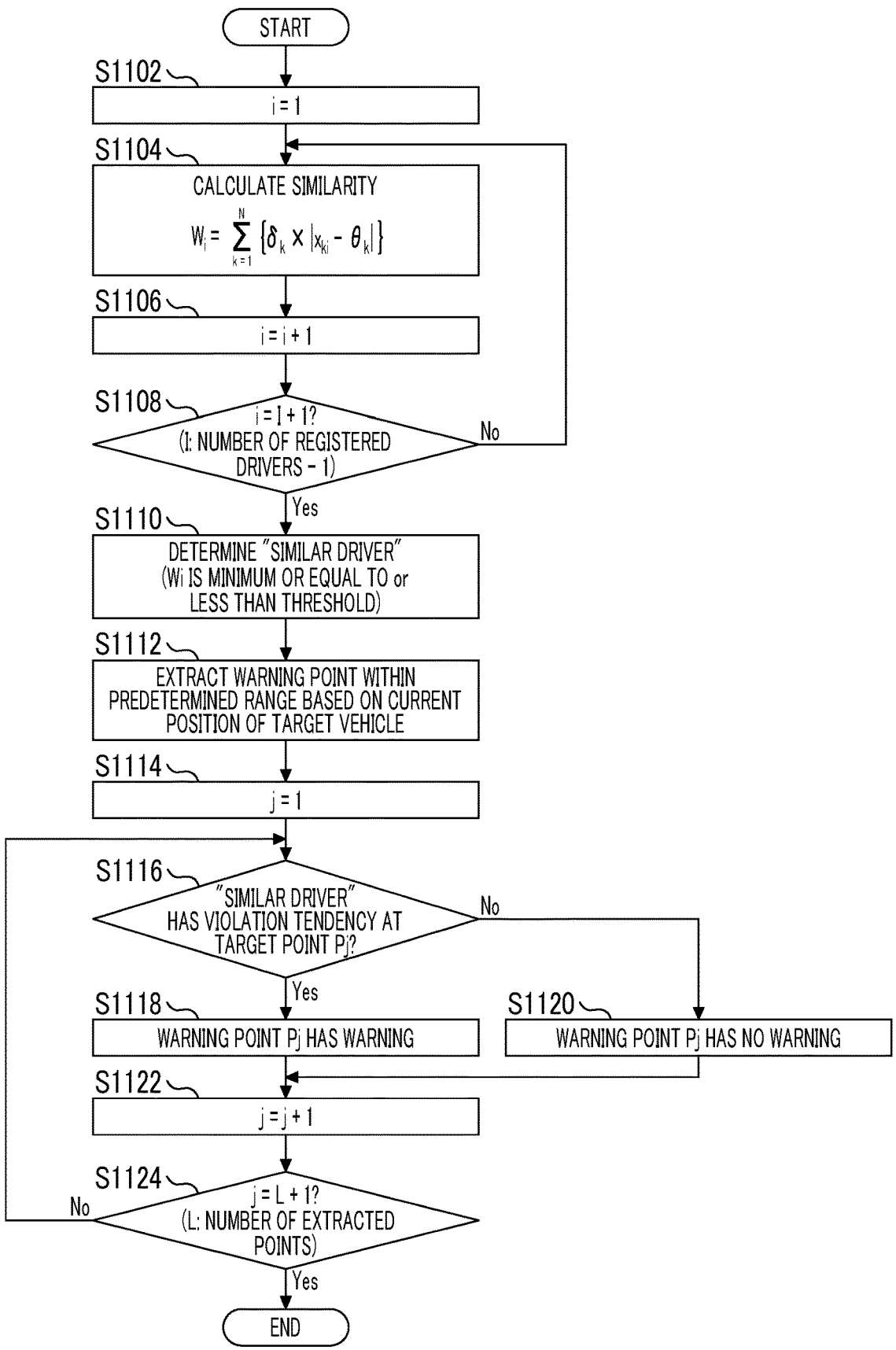
FIG. 11 is a flowchart schematically showing an example of warning point list creation processing in the center server.

Subsequently, FIG. 11 is a flowchart schematically showing an example of warning point list creation processing in the center server 100. The processing of the flowchart is executed in a case where the inquiry of the warning point list is received from the vehicle 5 by the communication processing unit 1201.

Hereinafter, description will be provided on an assumption that the driver number i (i=1, . . . , I) is numbered for each registered driver other than the current driver (target driver) of the vehicle 5 (target vehicle) as an inquiry source of the warning point list.

In Step S1102, the warning point list creation unit 1207 sets the variable i to "1" (i=1).

In Step S1104, the warning point list creation unit 1207 calculates the degree of similarity Wi of the registered driver of the driver number i to the target driver using Expression (1) described above. At this time, the warning point list creation unit 1207 can specify the target driver based on information (for example, the driver ID or the like) for specifying the current driver included in the inquiry of the warning point list received by the communication processing unit 1201.

In Step S1106, the warning point list creation unit 1207 increments the variable i by 1 (i=i+1).

In Step S1108, the warning point list creation unit 1207 determines whether or not the value of the variable i is "I+1" (i=I+1). That is, the warning point list creation unit 1207 determines whether or not the similarities (similarities W1 to WI) of all registered driver to the target driver are calculated. The warning point list creation unit 1207 determines that the similarities Wi of all registered drivers are calculated in a case where the value of the variable i is "I+1" and progresses to Step S1110. Otherwise, the warning point list creation unit 1207 returns to Step S1104 and repeats the processing of Steps S1104 to S1108.

In Step S1110, the warning point list creation unit 1207 extracts (determines) a similar driver based on the calculated similarities W1 to WI. Specifically, the warning point list creation unit 1207 may extract the registered driver having the minimum degree of similarity Wi as a similar driver, or may extract the registered driver having the degree of similarity Wi equal to or less than the predetermined threshold as a similar driver.

Hereinafter, in the flowchart, description will be provided on an assumption that solely one similar driver is extracted.

In Step S1112, the warning point list creation unit 1207 extracts warning points within a predetermined range (for example, within 5 km) based on the positional information (current position) of the target vehicle included in the inquiry of the warning point list based on the warning point information DB 1205.

Hereinafter, description will be provided on an assumption that a warning point number j (j=1, . . . , L. L is the number of extracted warning points) is numbered for each of the extracted warning points.

In Step S1114, the warning point list creation unit 1207 sets the variable j to "1".

In Step S1116, the warning point list creation unit 1207 determines whether or not the similar driver has a tendency to violate a traffic regulation at a warning point pj based on the driving operation information DB 1202. Specifically, the warning point list creation unit 1207 determines whether or not "x" is stored in the warning point pj of the driving operation information DB 1202 shown in FIG. 5. The warning point list creation unit 1207 progresses to Step S1118 in a case where the similar driver has a tendency to violate the traffic regulation at the warning point pj, and progresses to Step S1120 otherwise.

In Step S1118, the warning point list creation unit 1207 determines the presence of output of a regulation observance warning at the warning point pj.

In Step S1120, the warning point list creation unit 1207 determines the absence of the output of the regulation observance warning at the warning point pj.

In Step S1122, the warning point list creation unit 1207 increments the variable j by 1 (j=j+1).

In Step S1124, the warning point list creation unit 1207 determines whether or not the variable j is "L+1" (j=L+1). That is, the warning point list creation unit 1207 determines whether or not the presence or absence of the output of the regulation observance warning to the driver of the target vehicle for all extracted warning points pj is determined. The warning point list creation unit 1207 determines that the presence or absence of the output of the regulation observance warning for all extracted warning points pj is determined in a case where the variable j is "L+1" and ends the present processing. Otherwise, the warning point list creation unit 1207 returns to Step S1116 and repeats the processing of Steps S1116 to S1124.

Operation

In the first embodiment, the warning output unit 208 outputs a warning (regulation observance warning) to prompt observance of a predetermined traffic regulation to be applied when the vehicle 5 passes through a predetermined position in a predetermined direction before the vehicle 5 mounted with the warning output unit 208 passes through the predetermined position (warning point) in the predetermined direction (target passing direction). Then, the warning output unit 208 changes an output state of the warning (specifically, the presence or absence of the output of the warning, or the like) based on an observance tendency of another driver (similar driver) relating to a traffic regulation determined to be similar in a predetermined characteristic to a driver of the vehicle 5.

With this, the driving assistance device 10 can suppose that the target driver also has the same observance tendency from the observance tendency of another driver (similar driver) relating to the traffic regulation similar in characteristics to a driver (target driver) to be a target at the predetermined position. Accordingly, the driving assistance device 10 takes into account the observance tendency of the similar driver relating to the traffic regulation, thereby outputting the warning to prompt observance of the traffic regulation taking the characteristics of the target driver into consideration.

In the first embodiment, the warning output unit 208 may change a level (strength) of the regulation observance warning, instead of or in addition to the presence or absence of the output of the regulation observance warning, as the output state of the regulation observance warning based on the observance tendency of the similar driver relating to the traffic regulation. For example, the warning output unit 208 may change the level of the regulation observance warning such that the lower the observance ratio of the similar driver relating to the traffic regulation, the higher the level of the regulation observance warning. At this time, the warning output unit 208 can change the level of the regulation observance warning, for example, by changing a content of character information to be displayed on the display 70 or changing a volume of sound or a content of sound to be output from the speaker 80.

In the first embodiment, the warning determination unit 207 determines, based on the observance tendency of the similar driver relating to the traffic regulation, the presence or absence of the output of the regulation observance warning in a case where the vehicle 5 passes through the predetermined position in the predetermined direction. Then, the warning output unit 208 outputs the regulation observance warning based on the determination result of the warning determination unit 207 in a case where the vehicle 5 passes through the predetermined position in the predetermined direction.

With the above, the driving assistance device 10 determines the presence or absence of the output of the regulation observance warning, thereby specifically outputting a warning taking the characteristics of the target driver into consideration.

The warning determination unit 207 may determine a level of the regulation observance warning, instead of or in addition to the presence or absence of the output of the regulation observance warning, based on the observance tendency of the similar driver relating to the traffic regulation. Then, the warning output unit 208 may output the regulation observance warning at the level determined by the warning determination unit 207.

With the above, the driving assistance device 10 can specifically change the level of the regulation observance warning based on the observance tendency of the similar driver relating to the traffic regulation.

In the first embodiment, the communication processing unit 201 acquires information relating to the observance tendency of the similar driver relating to the traffic regulation from the center server 100 communicable with the target vehicle (vehicle 5). Then, the warning determination unit 207 determines, based on information (warning point list) relating to the observance tendency of the similar driver relating to the traffic regulation acquired from the center server 100, the presence or absence of the output of the regulation observance warning in a case where the vehicle 5 passes through the predetermined position in the predetermined direction.

With this, the driving assistance device 10 can specifically determine the presence or absence of output of the regulation observance warning using information acquired from the remote center server 100.

The warning determination unit 207 may of course determine the level of the regulation observance warning instead of or in addition to the presence or absence of the regulation observance warning based on information relating to the observance tendency of the similar driver relating to the traffic regulation at the predetermined position acquired from the center server 100.

With this, the driving assistance device 10 can specifically determine the level of the regulation observance warning using information acquired from the remote center server 100.

In the first embodiment, the communication processing unit 201 acquires, from the center server 100, information (warning point list) indicating the presence or absence of the output of the regulation observance warning, determined based on the observance tendency of the similar driver relating to the traffic regulation, in a case where the vehicle 5 passes through the predetermined position in the predetermined direction.

With this, since the driving assistance device 10 can acquire information indicating the presence or absence of the output of the regulation observance warning, the driving assistance device 10 can comparatively easily determine the presence or absence of the output of the regulation observance warning. That is, the driving assistance device 10 can output a regulation observance warning with simple processing.

The communication processing unit 201 may acquire information indicating the level of the regulation observance warning, instead of or in addition to the presence or absence of the output of the regulation observance warning, from the center server 100. That is, the communication processing unit 201 may acquire the warning point list having the presence or absence or the level of the regulation observance warning defined at each warning point from the center server 100.

With this, the driving assistance device 10 can comparatively easily determine the level of the regulation observance warning.

In the first embodiment, in the driving operation information DB 1202, the regulation observance information acquired from a plurality of vehicles 5 relating to the presence or absence of driver's observance of the predetermined traffic regulation to be applied when the vehicle 5 to be a target of the regulation observance warning passes through the predetermined position (warning point) in the predetermined direction is stored. In the driving behavior characteristic information DB 1203 and the basic characteristic information DB 1204, the driver characteristic information (driving behavior characteristic information or basic characteristic information) relating to a predetermined characteristic item of the driver of each of the vehicles 5 is stored. The warning point list creation unit 1207 extracts another driver (similar driver) similar in the predetermined characteristic item to a driver (target driver) of one vehicle 5 (target vehicle) included in the vehicles 5 from among the drivers of the vehicles 5 based on the driver characteristic information. Then, the communication processing unit 1201 transmits, to the one vehicle 5, information relating to the observance tendency of the similar driver relating to the traffic regulation at the predetermined position based on the regulation observance information (specifically, the driving operation information generated from the regulation observance information) of the similar driver.

With this, the center server 100 can suppose, for example, from the observance tendency relating to the traffic regulation at the predetermined position (warning point) of another driver (similar driver) similar in the characteristics to the driver (target driver) of the one vehicle 5, that target driver also has the same observance tendency relating to the traffic regulation. Accordingly, the center server 100 transmits information relating to the observance tendency of the similar driver relating to the traffic regulation at the predetermined position to the one vehicle 5, thereby making a regulation observance warning taking the characteristics of the target driver into consideration through the observance tendency of the similar driver relating to the traffic regulation be output in the one vehicle 5.

In the first embodiment, the warning point list creation unit 1207 determines, based on the regulation observance information of the similar driver, the presence or absence of the output of the regulation observance warning in a case where the one vehicle 5 passes through the predetermined position in the predetermined direction. Then, the communication processing unit 1201 transmits information (warning point list) relating to a determination result of the warning point list creation unit 1207 to the one vehicle 5.

With this, the center server 100 can transmit information (warning point list) relating to the presence or absence of the output of the regulation observance warning to the one vehicle 5. Accordingly, the center server 100 can make the presence or absence of the output of the regulation observance warning be comparatively easily determined in the target vehicle. That is, the center server 100 can make the regulation observance warning be output in the target vehicle with simple processing.

The warning point list creation unit 1207 may determine the level of the regulation observance warning, instead of or in addition to the presence or absence of the output of the regulation observance warning, based on the regulation observance information (driving operation information) of the similar driver. Then, the communication processing unit 1201 may transmit information relating to the determination result of the warning point list creation unit 1207, that is, information (warning point list) indicating the presence or absence of the output of the regulation observance warning or the level of the regulation observance warning to the target vehicle. At this time, the warning point list creation unit 1207 may be configured, for example, in such a manner that the lower the observance ratio relating to the traffic regulation when the similar driver passes through the predetermined position (warning point) in the predetermined direction (target passing direction), the higher the level of the regulation observance warning.

With this, the center server 100 can make not only the presence or absence of the output of the regulation observance warning but also the level of the regulation observance warning be comparatively easily determined in the target vehicle.

In the first embodiment, the target vehicle is included in the vehicles 5, and the warning point list creation unit 1207 extracts the similar driver based on the driver characteristic information of the driver (target driver) of the one vehicle 5 and the driver characteristic information of each of the drivers of the vehicles 5 other than the one vehicle 5.

With this, the center server 100 can specifically extract another driver (similar driver) similar in the predetermined characteristic to the target driver based on the driver characteristic information of the target driver and the driver characteristic information of the drivers of the vehicles 5 other than the target driver.

In the first embodiment, the warning point list creation unit 1207 extracts the similar driver in such a manner that the smaller the difference between a numerical value of a characteristic item of the driver of the one vehicle 5 and a numerical value of a characteristic item of each of the drivers of the vehicles 5 other than the one vehicle 5, the higher the degree of similarity between the driver of the one vehicle 5 and each of the drivers of the vehicles 5 other than the one vehicle 5. Specifically, the warning point list creation unit 1207 extracts the similar driver using Expression (1) described above.

With this, the center server 100 can specifically calculate the degree of similarity based on the difference between the numerical values of the target driver and a driver to be a comparison target for each of a plurality of characteristic items, and extract the similar driver.

The number of characteristic items for use in extracting the similar driver may be one.

In the first embodiment, the characteristic items include items relating to a driving behavior including the average vehicle speed, the frequency of sudden start, the frequency of sudden stop, the frequency of sudden steering, and the frequency of drift of the vehicle.

With this, the center server 100 can specifically extract the similar driver taking the characteristic items relating to the driving behavior of the driver into consideration. Accordingly, the center server 100 can make the regulation observance warning be output in the target vehicle taking the characteristics relating to the driving behavior of the target driver into consideration.

In the first embodiment, in extracting the similar driver, a plurality of items among the average vehicle speed, the frequency of sudden start, the frequency of sudden stop, the frequency of sudden steering, and the frequency of drift of the vehicle are taken into consideration; however, at least one item may be taken into consideration.

In the first embodiment, the characteristic items include items relating to a driving experience including at least one of the number of years of driving and the traveling distance.

With this, the center server 100 can specifically extract the similar driver taking the characteristic items relating to the driving experience of the driver into consideration. Accordingly, the center server 100 can make the regulation observance warning be output in the target vehicle taking the characteristics relating to the driving experience of the target driver into consideration.

In the first embodiment, in extracting the similar driver, both of the number of years of driving and the traveling distance are taken into consideration; however, solely one of the number of years of driving and the traveling distance may be taken into consideration. In the first embodiment, in extracting the similar driver, both of the characteristic items relating to the driving behavior and the characteristic items relating to the driving experience of the driver are used; however, solely one of the characteristic items relating to the driving behavior and the characteristic items relating to the driving experience of the driver may be used.

In the first embodiment, the characteristic items include items relating to a basic attribute including at least one of age and sex.

With this, the center server 100 can specifically extract the similar driver further taking the characteristic items relating to the basic attribute of the driver into consideration. Accordingly, the center server 100 can make the regulation observance warning be output in the target vehicle taking the characteristics relating to the basic attribute of the target driver into consideration.

In the first embodiment, in extracting the similar driver, both of the age and the sex of the driver are taken into consideration; however, solely one of the age and the sex of the driver may be taken into consideration. In the first embodiment, in extracting the similar driver, all of the characteristic items relating to the driving behavior, the driving experience, and the basic attribute of the driver are used; however, at least a part of the characteristic items may be used.

Second Embodiment

Next, a second embodiment will be described.

A driving assistance system 1 according to the second embodiment is different from the first embodiment in that the warning point list creation unit 1207 change information (characteristic value) of the characteristic items relating to the driving behavior of the driver of the target vehicle for use in extracting the similar driver according to circumstances.

Hereinafter, the same configurations as those in the first embodiment are represented by the same reference numerals, and description will be provided focusing on portions different from the first embodiment.

Configuration of Driving Assistance System

The driving assistance system 1 according to the second embodiment will be described referring to FIGS. 1 to 3.

As in the first embodiment, in a case where an inquiry of a warning point list is received from the vehicle 5 (target vehicle) by the communication processing unit 1201, the warning point list creation unit 1207 creates a warning point list. At this time, unlike the first embodiment, the inquiry of the warning point list received from the vehicle 5 by the communication processing unit 1201 (an example of a driver characteristic information acquisition unit) includes driving behavior information in a present trip.

As in the first embodiment, the warning point list creation unit 1207 calculates the degree of similarity using Expression (1) for each of the drivers of the vehicles 5 excluding the target vehicle regarding a plurality of characteristic items defined in the driving behavior characteristic information DB 1203 and the basic characteristic information DB 1204.

Here, the warning point list creation unit 1207 determines whether or not the difference between a characteristic value of a characteristic item (driving behavior characteristic item) relating to a driving behavior in the present trip of the driver (target driver) of the target vehicle based on the driving behavior information included in the inquiry and a characteristic value of a driving behavior characteristic item of the target driver over the past stored in the driving behavior characteristic information DB 1203 exceeds a predetermined reference. For example, the warning point list creation unit 1207 calculates the degree of similarity of the driving behavior characteristic of the target driver over the past and the driving behavior characteristic of the target driver in the present trip using the same method as Expression (1), and determines whether or not the degree of similarity exceeds a predetermined threshold.

The driving behavior information of the present trip may be reflected in or may not be reflected in the characteristic value of the characteristic item relating to the driving behavior of the target driver over the past stored in the driving behavior characteristic information DB 1203.

Then, in a case where there is the difference exceeding the predetermined reference between the characteristic value of the driving behavior characteristic item of the target driver in the present trip and the characteristic value of the driving behavior characteristic item stored in the driving behavior characteristic information DB 1203, the warning point list creation unit 1207 extracts the similar driver based on the characteristic value of the driving behavior characteristic item of the present trip. Specifically, the warning point list creation unit 1207 uses the characteristic value of the driving behavior characteristic item of the target driver in the present trip as Ok of the driving behavior characteristic item of Expression (1). With this, in a case where the characteristic relating to the driving behavior of the target driver is different from during normal, it is possible to extract a similar driver in conformity with the circumstance of the driving behavior of the target driver different from during normal. For this reason, as a result, it is possible to make a regulation observance warning be output in the target vehicle in conformity with the circumstance of the target driver.

For example, FIG. 12 is a table showing an example of driving behavior characteristics of a target driver over the past and driving behavior characteristics of a present trip.

As shown in FIG. 12, in the example, the driving behavior characteristics of the present trip are that the average vehicle speed is higher by 15 km/h, the frequency of sudden start and sudden stop increases by 30%, and the frequency of sudden steering increases by 25% with respect to the driving behavior characteristics over the past. That is, while the driver of the vehicle 5 is normally driving comparatively taking safety into consideration, solely in the present trip, it is understood that the driving behavior of the target driver is rough for any reason, such as being behind schedule. Accordingly, the warning point list creation unit 1207 extracts the similar driver using the characteristic value of the characteristic item relating to the driving behavior of the target driver in the present trip in the above-described circumstance, thereby making the regulation observance warning be output in the target vehicle in conformity with the characteristic of the target driver having a rough driving behavior.

Operation

In the second embodiment, the communication processing unit 1201 acquires the driver characteristic information (the driving behavior information as original information of the driving behavior characteristic information) from the vehicles 5. Then, in a case where there is the difference exceeding the predetermined reference between the past driver characteristic information (driving behavior characteristic information) of the driver of the target vehicle and the present driver characteristic information (driving behavior characteristic information) after start of the driver of the target vehicle, the warning point list creation unit 1207 extracts the similar driver based on the present driver characteristic information (driving behavior characteristic information) after start of the driver of the one vehicle 5 in the driver characteristic information of the driver of the one vehicle 5 and the driver characteristic information (driving behavior characteristic information) of each of the drivers of the vehicles 5 other than the one vehicle 5.

With this, in a case where there is a certain level of difference between the past driver characteristic information (driving behavior characteristic information) of the target driver and the present (present trip) driver characteristic information (driving behavior characteristic information) to some extent, the center server 100 can determine that the characteristic of the target driver is different from during normal, for example, the target driver is about to be late. Accordingly, in the case described above, the center server 100 extracts the similar driver solely using the present driver characteristic information (driving behavior characteristic information) of the target driver after the start of the one vehicle 5, not the past driver characteristic information (driving behavior characteristic information), thereby making a regulation observance warning be output in the one vehicle 5 in conformity with the characteristic of the target driver different from during normal.

Although the mode for carrying out the present disclosure has been described above in detail, the present disclosure is not limited to a concerned specific embodiment, and various modifications and alterations may be made without departing from the spirit of the present disclosure described in the appended claims.

For example, in the second embodiment, although the driving behavior characteristic information is generated based on the driving behavior information transmitted from each vehicle 5 to the center server 100, the driving behavior characteristic information may be generated based on information obtained from another information source. Specifically, the driving behavior characteristic information may be generated based on a questionnaire result relating to a driving action for each of the drivers of the vehicles 5. At this time, the questionnaire result may be manually loaded in the center server 100 by an administrator or the like, and in a case of a questionnaire on a predetermined Web page, the questionnaire result may be loaded in the center server from a Web server corresponding to the Web page by way of a predetermined network.

For example, in the above-described embodiments, the functions of the warning determination unit 207 are transferred to the center server 100. In this case, the center server 100 makes the positional information be uploaded successively from the vehicles 5, thereby determining whether or not the vehicle 5 arrives near a warning point in a manner of passing through the warning point in the target passing direction. Then, the center server 100 confirms the warning point list, and in a case of the presence of the output of the regulation observance warning, transmits an output command to the vehicle 5, thereby making the regulation observance warning be output in the vehicle 5. In a case where the level of the regulation observance warning is defined in the warning point list, the center server 100 transmits an output command including the level of the regulation observance warning to the vehicle 5, thereby making the regulation observance warning at the defined level be output in the vehicle 5. With this, the same functional effects as in the above-described embodiments are obtained.

For example, in the above-described embodiments, the function of creating the warning point list may be transferred to each vehicle 5. In this case, the center server 100 may solely extract the similar driver and the warning points surrounding the vehicle 5 as an inquiry source, and may transmit information relating to the extracted warning points and the driving operation information of the similar driver for the extracted warning points to the vehicle 5. With this, the driving assistance device 10 of the vehicle 5 may determine the warning point list, that is, the presence or absence of the regulation observance warning or the level of the warning level at each warning point based on information relating to the warning point and the driving operation information of the similar driver received from the center server 100. With this, the same functional effects as in the above-described embodiments are obtained.

What is claimed is:

1. An information processing device comprising:
   communication equipment; and
   a processing device configured to
      acquire and store a predetermined traffic regulation to be applied when each of a plurality of vehicles passes through a predetermined position in a predetermined direction and regulation observance information relating to an observance tendency of a driver of each of the vehicles relating to the predetermined traffic regulation from the vehicles through the communication equipment,
      store driver characteristic information relating to a predetermined characteristic item of the driver of each of the vehicles,
      extract another driver among the drivers of the vehicles similar in the characteristic item to a driver of one vehicle among the drivers of the vehicles based on the driver characteristic information, and
      transmit information relating to an observance tendency of the other driver relating to the traffic regulation to the one vehicle through the communication equipment based on the regulation observance information of the other driver.

2. The information processing device according to claim 1, wherein:
   the processing device is configured to, based on the regulation observance information of the other driver, determine the presence or absence of output of a warning to prompt observance of the traffic regulation or a level of the warning in a case where the one vehicle passes through the predetermined position in the predetermined direction; and
   the processing device is configured to transmit the information relating to the presence or absence of the output of the warning or the level of the warning determined by the processing device to the one vehicle.

3. The information processing device according to claim 2, wherein:
   the one vehicle is a vehicle during starting;
   the processing device is configured to acquire the driver characteristic information from the vehicles through the communication equipment;
   the processing device is configured to acquire a difference between the past driver characteristic information of the driver of the one vehicle and the present driver characteristic information after start of the driver of the one vehicle during starting; and
   the processing device is configured to, in a case where the difference exceeds a predetermined reference, extract the other driver based on the present driver characteristic information after start of the driver of the one vehicle and the driver characteristic information of each of the drivers of the vehicles other than the one vehicle.

4. The information processing device according to claim 1, wherein the processing device is configured to extract the other driver in such a manner that, when a difference between a numerical value of the characteristic item of the driver of the one vehicle and a numerical value of the characteristic item of each of the drivers of the vehicles other than the one vehicle becomes smaller, similarity of the driver of the one vehicle and each of the drivers of the vehicles becomes higher.

5. The information processing device according to claim 1, wherein:
   the characteristic item includes an item relating to a driving behavior; and
   the item relating to the driving behavior includes at least one of an average vehicle speed, a frequency of sudden start, a frequency of sudden stop, a frequency of sudden steering, and a frequency of drift of the vehicle.

6. The information processing device according to 1, wherein:
   the characteristic item includes an item relating to a driving experience; and
   the item relating to the driving experience includes at least one of the number of years of driving and a traveling distance.

7. The information processing device according to claim 5, wherein:
   the characteristic item includes an item relating to a basic attribute; and
   the item relating to the basic attribute includes at least one of age and sex.

8. A driving assistance system comprising:
   a plurality of vehicles; and
   a server configured to be able to perform communication with the vehicles,
   wherein:
      the server is configured to
         acquire and store a predetermined traffic regulation to be applied when each of the vehicles passes through a predetermined position in a predetermined direction and regulation observance information relating to an observance tendency of a driver of each of the vehicles relating to the predetermined traffic regulation from the vehicles,
         store driver characteristic information relating to a predetermined characteristic item of the driver of each of the vehicles,
         extract another driver among the drivers of the vehicles similar in the characteristic item to a driver of one vehicle among the drivers of the vehicles based on the driver characteristic information, and transmit information relating to an observance tendency of the traffic regulation of the other driver to the one vehicle based on the regulation observance information of the other driver;

at least one of the vehicles is configured to, before the vehicle passes through the predetermined position in the predetermined direction, output a warning to prompt observance of the predetermined traffic regulation; and the vehicle is configured to change an output state of the warning based on information relating to the observance tendency of the other driver relating the traffic regulation received from the server.

* * * * *